US010340508B2

United States Patent
Liu et al.

(10) Patent No.: US 10,340,508 B2
(45) Date of Patent: Jul. 2, 2019

(54) POROUS SILICON OXIDE (SIO) ANODE ENABLED BY A CONDUCTIVE POLYMER BINDER AND PERFORMANCE ENHANCEMENT BY STABILIZED LITHIUM METAL POWER (SLMP)

(71) Applicants: Gao Liu, Piedmont, CA (US); Hui Zhao, Emeryville, CA (US)

(72) Inventors: Gao Liu, Piedmont, CA (US); Hui Zhao, Emeryville, CA (US)

(73) Assignee: The Regents of the University of California, Oakland, CA (US)

( * ) Notice: Subject to any disclaimer, the term of this patent is extended or adjusted under 35 U.S.C. 154(b) by 312 days.

(21) Appl. No.: 14/741,383

(22) Filed: Jun. 16, 2015

(65) Prior Publication Data

US 2016/0164073 A1    Jun. 9, 2016

Related U.S. Application Data

(60) Provisional application No. 62/012,876, filed on Jun. 16, 2014.

(51) Int. Cl.
*H01M 4/36* (2006.01)
*H01B 1/12* (2006.01)
(Continued)

(52) U.S. Cl.
CPC ............ *H01M 4/364* (2013.01); *H01B 1/128* (2013.01); *H01B 1/22* (2013.01); *H01M 4/0404* (2013.01);
(Continued)

(58) Field of Classification Search
None
See application file for complete search history.

(56) References Cited

U.S. PATENT DOCUMENTS

| 8,021,496 B2 * | 9/2011 | Yakovleva | B22F 1/0062 |
| | | | 106/14.05 |
| 2007/0224509 A1 * | 9/2007 | Aramata | H01M 4/131 |
| | | | 429/231.95 |

(Continued)

OTHER PUBLICATIONS

Krause, B et al, Bicontinuous Nanoporous Polymers by Carbon Dioxide Foaming, Macromolecules 2001, 34, 3792-8801.
(Continued)

*Primary Examiner* — Rena Dye Cronin
(74) *Attorney, Agent, or Firm* — Robin C. Chiang; Lawrence Berkeley National Laboratory

(57) ABSTRACT

The invention demonstrates that only 2% functional conductive polymer binder without any conductive additives was successfully used with a micron-size silicon monoxide (SiO) anode material, demonstrating stable and high gravimetric capacity (>1000 mAh/g) for ~500 cycles and more than 90% capacity retention. Prelithiation of this anode using stabilized lithium metal powder (SLMP®) improves the first cycle Coulombic efficiency of a SiO/NMC full cell from ~48% to ~90%. This combination enables good capacity retention of more than 80% after 100 cycles at C/3 in a lithium-ion full cell. We also demonstrate the important connection between porosity and the loading of silicon electrodes. By employing a highly porous silicon electrode, a high areal capacity (3.3 mAh/cm$^2$) is obtained. This method works well to achieve high loading of other high-capacity alloy anodes, the state-of-art graphite anode, as well as a high loading of positive electrodes for LIBs.

6 Claims, 20 Drawing Sheets

(51) Int. Cl.
| | |
|---|---|
| H01M 4/38 | (2006.01) |
| H01M 4/66 | (2006.01) |
| H01M 4/04 | (2006.01) |
| H01M 4/62 | (2006.01) |
| H01M 10/0525 | (2010.01) |
| H01B 1/22 | (2006.01) |
| H01M 4/13 | (2010.01) |
| H01M 4/48 | (2010.01) |
| H01M 4/02 | (2006.01) |

(52) U.S. Cl.
CPC ............ *H01M 4/13* (2013.01); *H01M 4/366* (2013.01); *H01M 4/382* (2013.01); *H01M 4/48* (2013.01); *H01M 4/483* (2013.01); *H01M 4/622* (2013.01); *H01M 4/623* (2013.01); *H01M 4/625* (2013.01); *H01M 4/661* (2013.01); *H01M 10/0525* (2013.01); *H01M 2004/021* (2013.01); *H01M 2004/027* (2013.01); *H01M 2220/20* (2013.01); *Y02T 10/7011* (2013.01)

(56) References Cited

U.S. PATENT DOCUMENTS

| | | | | |
|---|---|---|---|---|
| 2009/0035663 | A1* | 2/2009 | Yakovleva | B22F 1/0062 429/231.95 |
| 2011/0244333 | A1* | 10/2011 | Kawada | H01M 4/131 429/231.8 |
| 2011/0244334 | A1* | 10/2011 | Kawada | C23C 16/26 429/231.8 |
| 2012/0119155 | A1* | 5/2012 | Liu | B82Y 30/00 252/500 |
| 2012/0315530 | A1* | 12/2012 | Kageura | H01M 4/131 429/144 |
| 2013/0295439 | A1* | 11/2013 | Masarapu | H01M 4/485 429/163 |
| 2014/0004426 | A1* | 1/2014 | Kerlau | H01M 4/366 429/231.8 |
| 2014/0038046 | A1* | 2/2014 | Lee | H01M 4/622 429/217 |
| 2014/0065464 | A1* | 3/2014 | Masarapu | H01M 4/134 429/149 |

OTHER PUBLICATIONS

Krause, B et al, Open Nanoporous Morphologies from Polymeric Blends by Carbon Dioxide Foaming, Macromolecules 2002, 35, 1738-1745.

Liu, G et al, Polymers with Tailored Electronic Structure for High Capacity Lithium Battery Electrodes, Adv. Mater. 2011, 23, 4679-4683.

Liu, N et al, A pomegranate-inspired nanoscale design for large-volume-change lithium battery anodes, Nature Nanotechnology, 2014, 9, 187-192.

Wu, Dingcai et al, Design and Preparation of Porous Polymers, Chem. Rev. 2012, 112, 3959-4015.

* cited by examiner

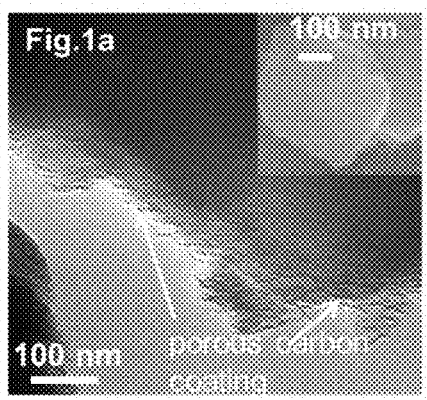
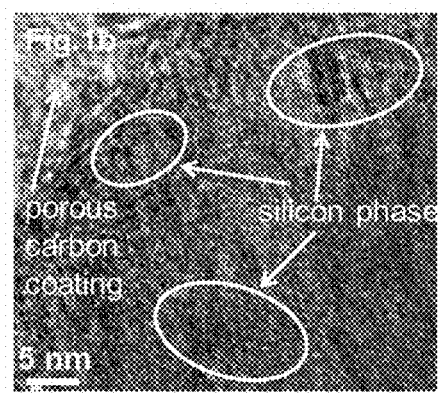
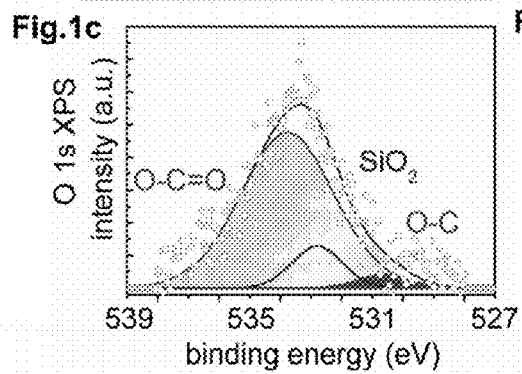
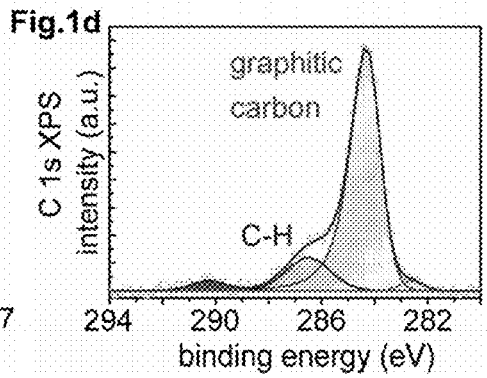

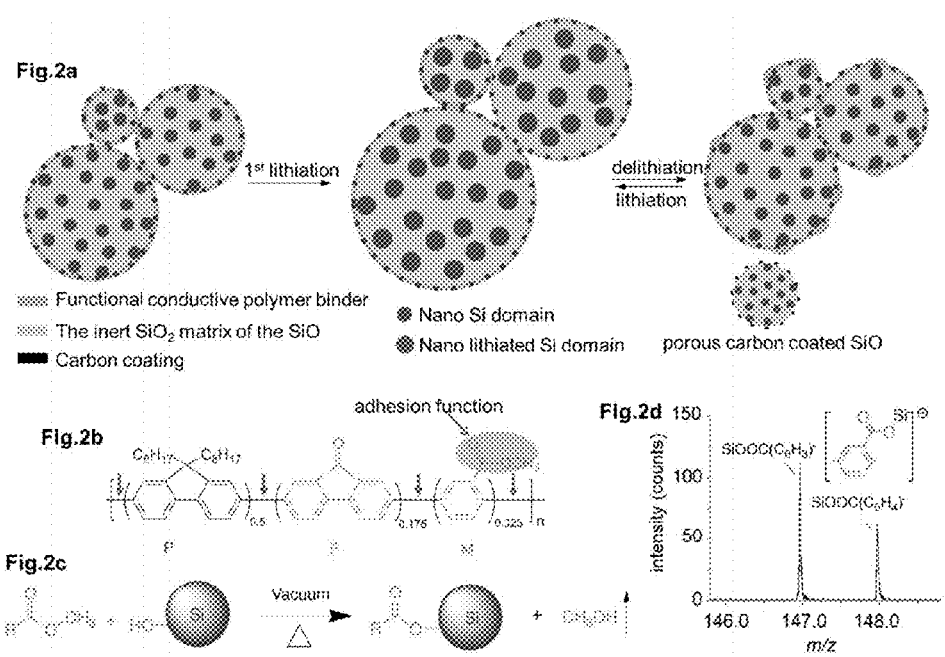

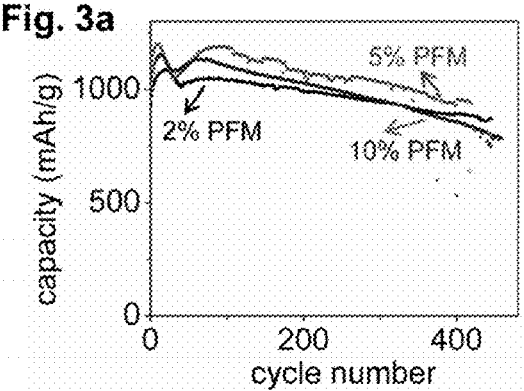
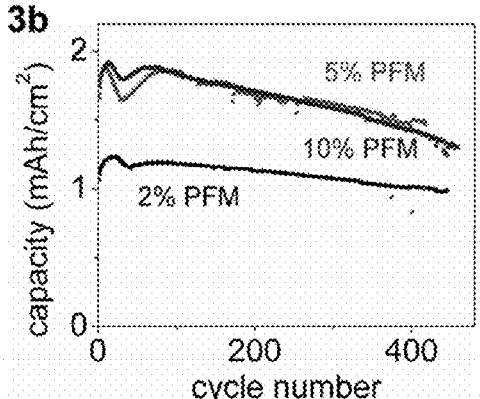
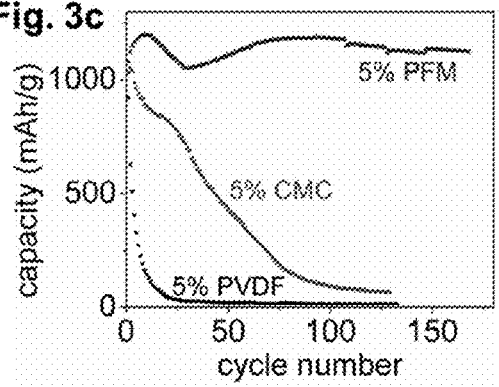
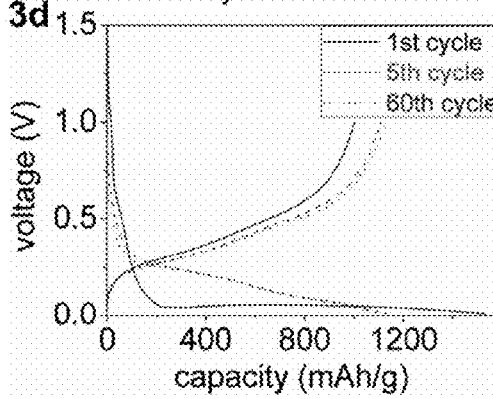
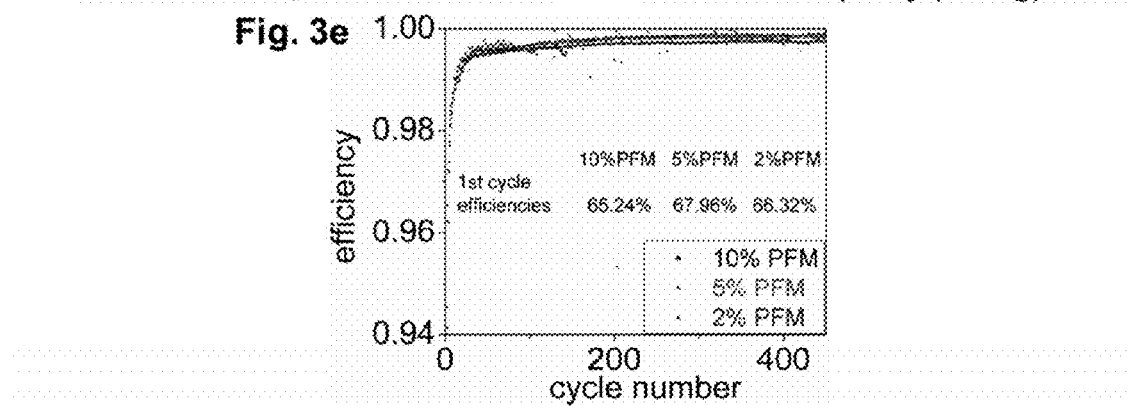

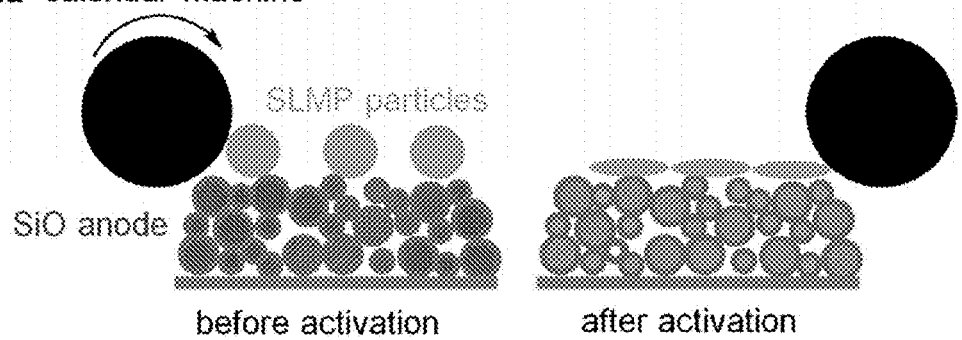
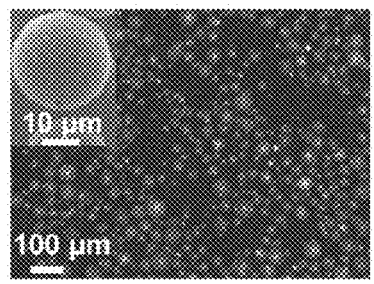
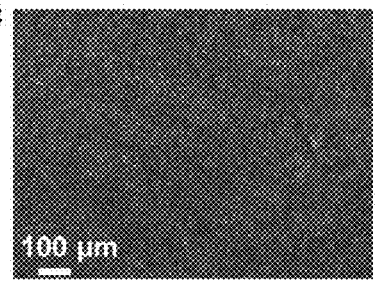
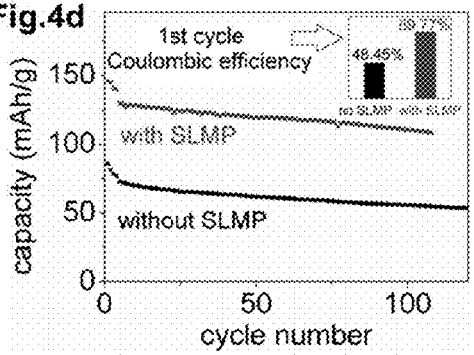
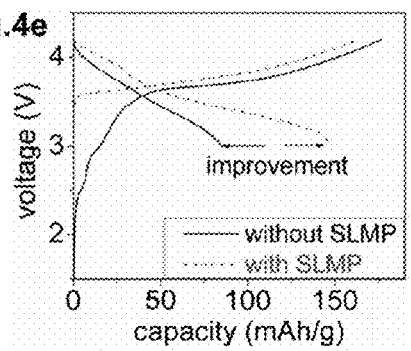

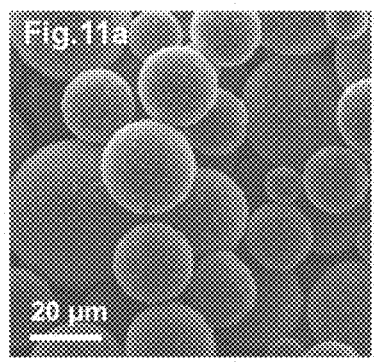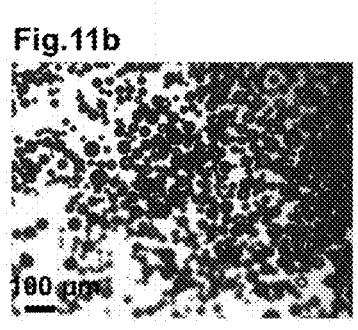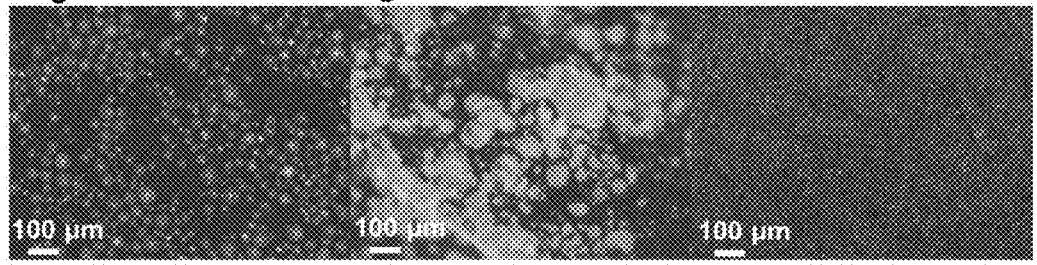

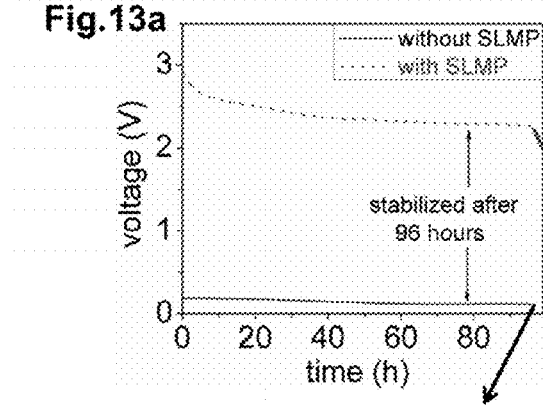
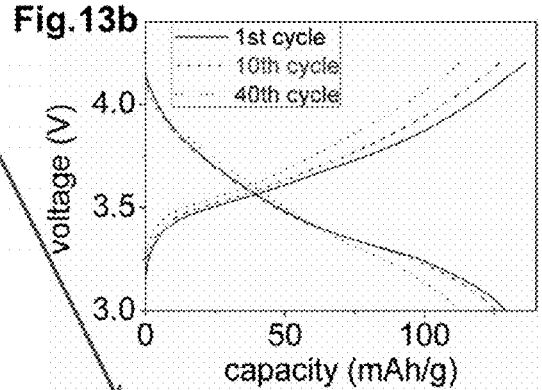
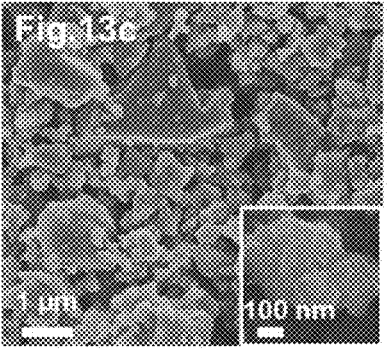
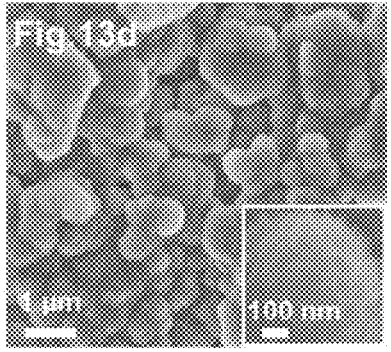
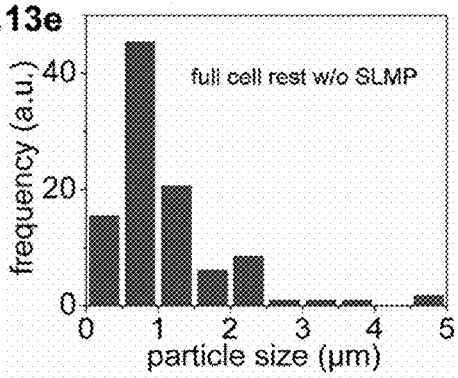
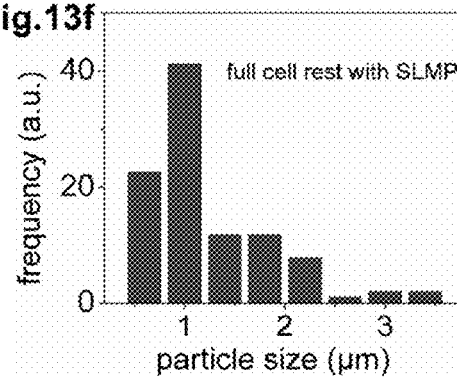

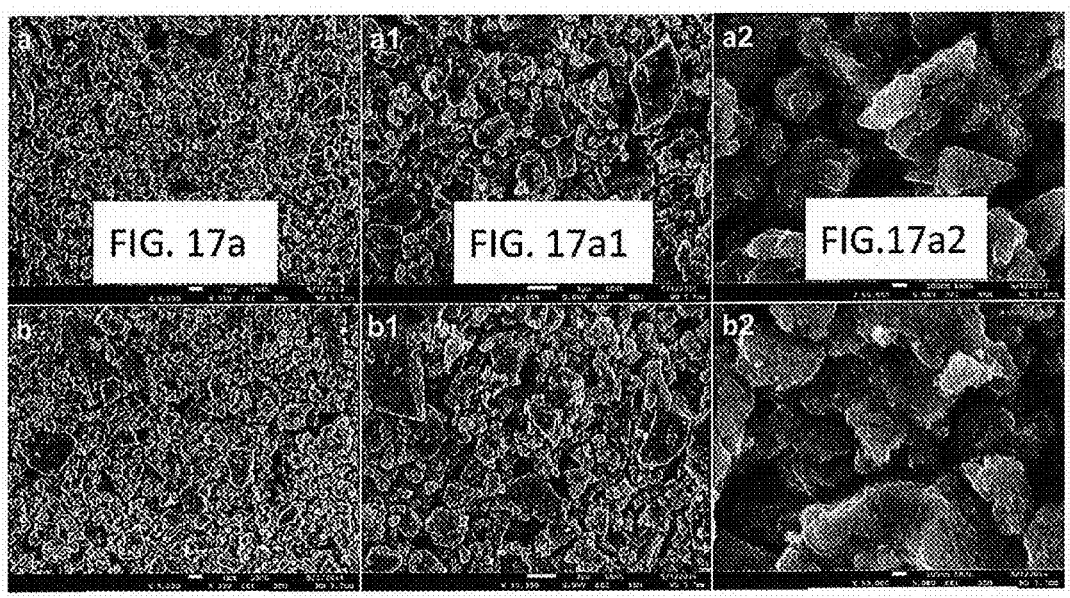
FIG. 17a    FIG. 17a1    FIG.17a2
FIG. 17b    FIG. 17b1    FIG. 17b2

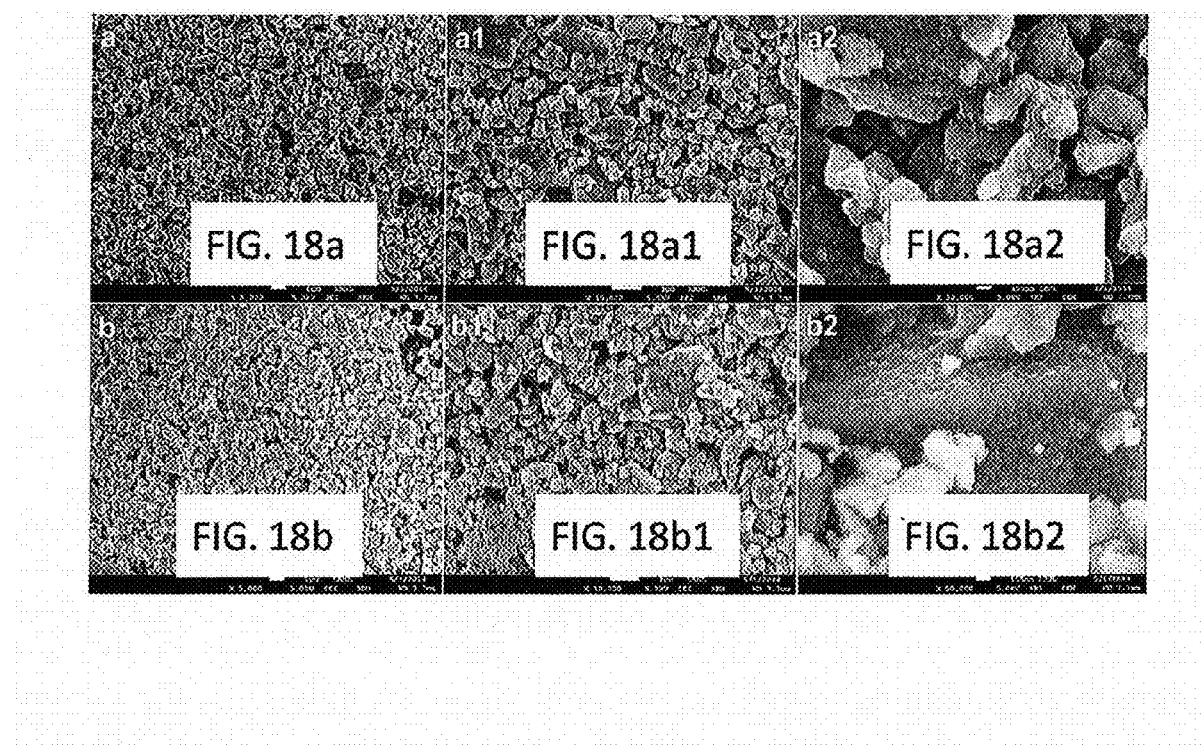

POROUS SILICON OXIDE (SIO) ANODE ENABLED BY A CONDUCTIVE POLYMER BINDER AND PERFORMANCE ENHANCEMENT BY STABILIZED LITHIUM METAL POWER (SLMP)

CROSS REFERENCE TO RELATED APPLICATIONS

This U.S. Utility application claims priority to U.S. Provisional Application Ser. No. 62/012,876 filed Jun. 16, 2014, which application is incorporated herein by reference as if fully set forth in their entirety.

STATEMENT OF GOVERNMENTAL SUPPORT

The invention described and claimed herein was made in part utilizing funds supplied by the U.S. Department of Energy under Contract No. DE-AC02-05CH11231 between the U.S. Department of Energy and the Regents of the University of California for the management and operation of the Lawrence Berkeley National Laboratory. The government has certain rights in this invention.

BACKGROUND OF THE INVENTION

Field of the Invention

The present invention relates to the field of Lithium ion batteries.

Related Art

Rechargeable lithium-ion batteries hold great promise as energy storage devices to solve the temporal and geographical mismatch between the supply and demand of electricity, and are therefore critical for many applications such as portable electronics and electric vehicles. Electrodes in these batteries are based on intercalation reactions in which Li+ ions are inserted (extracted) from an open host structure with electron injection (removal). However, the current electrode materials have limited specific charge storage capacity and cannot achieve the higher energy density, higher power density, and longer lifespan that all these important applications require. Si as an alloying electrode material is attracting much attention because it has the highest known theoretical charge capacity (4200 mA h g$^{-1}$). However, it is challenging to overcome the issues associated with alloying and conversion reactions, which involve large structure and volume changes (400% volume expansion for Si) during Li+ ion insertion and extraction. These issues can cause large hysteresis in the charge and discharge potentials, low power rate, and short cycle life, due to material instability, and poor electron and ion conduction.

Recently, Si nanostructures have been intensively explored to attack the volume expansion and fracture problem. For example, many Si nanostructures, such as Si nanowires, carbon/Si spheres, Si nanotubes, core-shell crystalline/amorphous Si nanowires, Si nanotubes, have also shown initial capacity close to the theoretical limit, good (>90%) capacity retention over a large number of cycles. However, low cost and fast throughput processes with great mass and morphology control are still desirable to reach the full potential for commercialization.

BRIEF DESCRIPTION OF THE DRAWINGS

The foregoing aspects and others will be readily appreciated by the skilled artisan from the following description of illustrative embodiments when read in conjunction with the accompanying drawings.

FIG. 1a illustrates a TEM image of a carbon-coated SiO particle, indicating the porous nature of the carbon coating. The inset shows the SEM image of a single SiO particle, both with a scale bar of 100 nm. FIG. 1b illustrates a HRTEM image of the SiO particle. The elliptical shapes indicate the Si nano-domains within the SiO$_2$ matrix. The amorphous carbon coating is at the outer surface of the SiO particles. FIG. 1c and FIG. 1d illustrates the observation of SiO$_2$ and carbon coating from XPS spectra was acquired simultaneously at the outer surface of the SiO materials, with a depth penetration of 2~4 nm. Open circles are experimental data, while solid lines are the results of a Gaussian deconvolution fitting.

FIG. 2a illustrates the schematic of an electrode design with low concentration of functional conductive polymer binder and SiO, enabled by strong adhesion of covalent functionality and electronic conduction of functional conductive polymer binder. FIG. 2b illustrates the chemical structure of the PFM functional conductive polymer binder. The vertical arrows indicate the most likely chemical bonds to be broken during the ionization process in the TOF-SIMS measurement. The elliptical shadow highlights the ester group that forms adhesion bonds with the SiOH surface. FIG. 2c illustrates the trans-esterification reaction between the ester functional group of the PFM binder and the SiOH surface group, which provides strong adhesion, during the electrode drying process. FIG. 2d illustrates the TOF-SIMS result of the binder and active materials interface that shows the evidence of chemical bonding between the binder and the active materials.

FIG. 3a illustrates the galvanostatic cycling performance of SiO anodes with 2%, 5%, and 10% by weight of a PFM binder using lithium counter electrodes at a C/10 rate (200 mA/g). FIG. 3b illustrates the same data from FIG. 3a plotted in areal loading. FIG. 3c illustrates the comparison of the electrochemical performance of SiO electrodes made with 5% by weight of PVDF, CMC, and PFM binders using lithium counter electrodes at a C/10 rate. FIG. 3d illustrates the 1st, 5th, and 60th cycle potential vs. the capacity curves of a 2% PFM/SiO electrode. FIG. 3e illustrates the coulombic efficiencies of the three PFM-based cells.

FIG. 4a illustrates the schematics of the utilization of SLMP for the SiO electrode. SLMP particles are loaded on to the SiO anode. Rolling compression was used to crush the Li$_2$CO$_3$ shell of SLMP to release lithium metal and laminate it on the surface of SiO electrode. This process is called SLMP activation. FIG. 4b illustrates the SLMP particles loaded on the SiO electrode before activation. The inset shows the SEM image of a single SLMP particle. FIG. 4c illustrates the SiO electrode surface after electrolytes are added onto the SiO electrode with activated SLMP after 12 hours. This shows the disappearance of SLMP and indicates the successful prelithiation of the SiO electrode. FIG. 4d illustrates the SiO/NMC full cell performance with or without the SLMP capacity-enhancement additive, two cycles at C/20, two cycles at C/10, and then C/3. FIG. 4e illustrates the first cycle voltage curves of the two cells.

FIG. 11a illustrates the SEM image of the SLMP. FIG. 11b illustrates the image of SLMP illustrates the particles, FIG. 11c illustrates the SLMP particles loaded on the SiO electrode before activation. FIG. 11d illustrates the SiO electrode surface after SLMP activation. FIG. 11e illustrates the SiO electrode surface after electrolytes are added onto the SiO electrode with activated SLMP after 12 hours. FIGS. 11b-11c are optical microscopy images of the SLMP.

FIG. 13a illustrates the voltage curves of SiO/NMC full cell with or without the SLMP prelithiation, during cell equilibration before cycling of SiO electrode with FIG. 11b which illustrates the $1^{st}$, $10^{th}$ and $40^{th}$ cycle voltage curves of the SiO/NMC full cell with SLMP. FIG. 13c illustrates SEM images of the SiO anode equilibrated in a full cell without SLMP. FIG. 13d illustrates SEM image of the SiO anode equilibrated in a full cell with SLMP for 96 hours. The insets show magnified images of a single SiO particle. The scale bars: 1 µm for the larger photos, with 100 nm for the inset images. Particle size analysis based on the SEM of FIG. 13e SiO electrode rest without SLMP in full cell, FIG. 13f SiO electrode rest with SLMP in full cell.

FIG. 17a, FIG. 17a1, FIG. 17a2, FIG. 17b, FIG. 17b1, and FIG. 17b2 illustrate SEM images of SiO/PFM electrode with 10% NaCl (a)(a1)(a2) before and (b)(b1)(b2) after washing. The scale bars are 1 µm for (a)(a1)(b)(b1), 100 nm for (a2)(b2).

FIG. 18a, FIG. 18a1, FIG. 18a2, FIG. 18b, FIG. 18b1, and FIG. 18b2 illustrate images of SiO/PFM electrode with 30% NaCl (a)(a1)(a2) before and (b)(b1)(b2) after washing. The scale bars are 1 µm for (a)(a1)(b)(b1), 100 nm for (a2)(b2).

DETAILED DESCRIPTION

Figure 5:
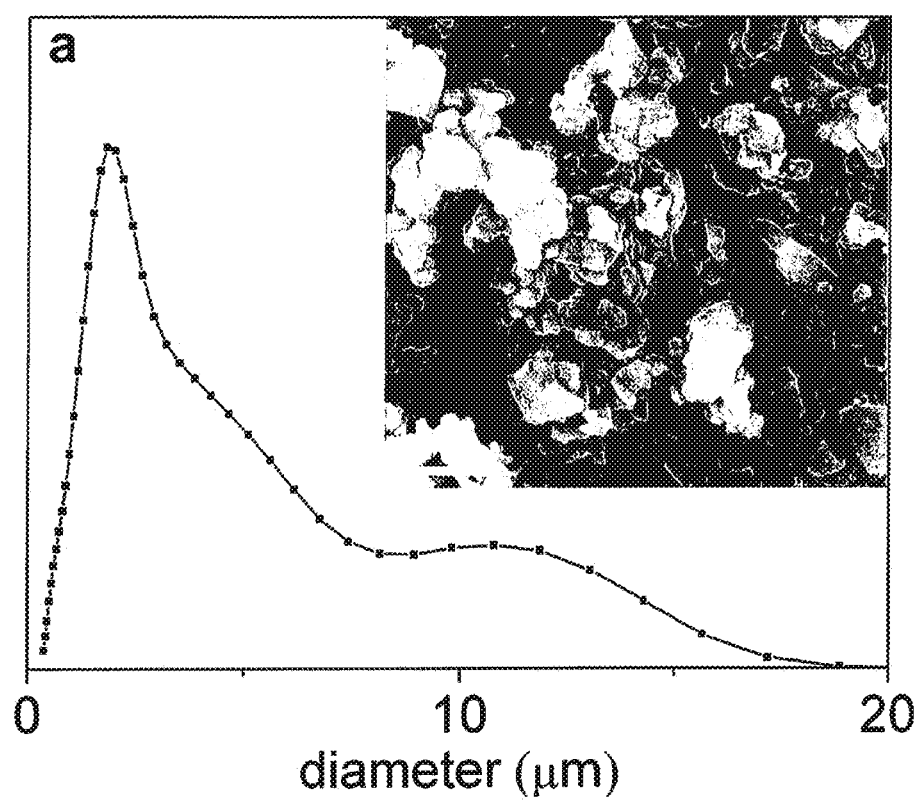
FIG. 5 illustrates (a) a particle size analysis (PSA) and (b) a SEM of the pristine SiO particles.

In the discussions that follow, various process steps may or may not be described using certain types of manufacturing equipment, along with certain process parameters. It is to be appreciated that other types of equipment can be used, with different process parameters employed, and that some of the steps may be performed in other manufacturing equipment without departing from the scope of this invention. Furthermore, different process parameters or manufacturing equipment could be substituted for those described herein without departing from the scope of the invention.

These and other details and advantages of the present invention will become more fully apparent from the following description taken in conjunction with the accompanying drawings.

Considerable efforts have been devoted to increasing the energy densities of lithium-ion batteries, in order to fulfill the demand for application in Electric Vehicle (EV)/Plug-in Hybrid Vehicle (PHEV). To further increase the energy density of the lithium-ion battery, new materials are being developed for higher capacity or increased cell voltage. All these materials choices pose new challenges when integrated into the lithium-ion electrode and into practical cell geometry.

State-of-art lithium-ion technology uses graphite as an active material in an anode, with a theoretical specific capacity of 372 mAh/g, this theoretical specific capacity is much less than the alternative alloy anode materials such as tin (Sn, 994 mAh/g) or silicon (Si, 4,200 mAh/g).

As a naturally abundant material, Si possesses the highest theoretical gravimetric specific capacity of any lithium-ion anode material. Electrochemical alloying of Li with Si produces $Li_{1.5}Si_4$ as the final lithiation state and a capacity of 3,580 mAh/g. However, almost 300% volume expansion occurs as the material transitions from Si to the fully lithiated phase (e.g. $Li_{1.5}Si_4$). Because of this high volume change, the electronic integrity of a composite electrode is disrupted and high and continuous surface side reactions are induced, leading to a drastic capacity fade.

Associated with these problems is that most of the current approaches in Si materials research have only achieved an areal capacity less than 1 $mAh/cm^2$ unless electrode architecture designs are integrated into the electrode fabrication process.

Recently, a conductive polymer binder Poly (9,9-dioctyl-fluorene-co-fluorenone-co-methylbenzoic ester) (PFM) was developed which combines adhesion with electrical conduction to provide molecular-level electronic connections between the active material and the conductive polymer matrix. The cycling stability of both silicon and tin electrodes is significantly enhanced using this approach. Moreover, being conductive itself, the use of the PFM conductive polymer binder eliminates the necessity of adding a conductive additive, which considerably increases the loading of active material. Wherein the loading of active material are approximately 70 wt % for a Si electrode and 95 wt % for a Sn electrode, which helps to increase the energy density of the lithium-ion cell.

Silicon monoxide (SiO) is a promising active material for anodes for lithium-ion batteries (LIBs). A random mixture (RM) model is normally used to describe the microstructure of SiO, which indicates that SiO has two separate phases in a nanodomain, Si ($Si^0$) and $SiO_2$ ($Si^{4+}$).

The $SiO_2$ inactive phase serves to buffer the volume change during lithiation and delithiation of the Si phase, as well as alleviate the stress during cycling and restrain the pulverization of the active Si phase. Most of the SiO-based materials have capacities of approximately 1000~2000 mAh/g. Although pure Si has a higher specific capacity, the large volume expansion leads to faster capacity decay. In contrast, using SiO with a specific capacity of ~1000 mAh/g, the volume change is limited to ~50% on the particle level. This relatively high specific capacity (three times that of carbon) and relatively low volume expansion, combined with a small initial specific surface area, make the SiO materials an attractive alternative to pure Si or Sn materials.

A conventional graphite electrode design is normally composed of active materials (carbon), conductive additives and a polymer binder. In contrast, the usage of SiO as an additive in a conventional graphite electrode has been limited to a few percent improvement due to the lack of an effective method to assemble high concentration of SiO materials. Strong adhesion is required to withhold the electrode structure of SiO during charge and discharge, as is uniform electronic conduction at the particle interface level and electrode level. Although a higher concentration of binder and conductive additive can fulfill these requirements, these inactive species (binder and carbon black) decrease the electrode level energy density to the extent that makes it less competitive than the state-of-the-art graphite electrode.

In one embodiment of the invention, the active material in the SiO material is silicon, and results demonstrate that a PFM conductive polymer binder works well for a SiO electrode. The first cycle Coulombic efficiency (CE) of SiO is typically low (50%~70%) since lithium reacts with silicon oxide to form silicate, which contributes to a large irreversible capacity loss. This irreversible capacity loss is a detrimental problem when assembling a full cell, since the precious lithium is irreversibly consumed. To compensate for the lithium consumption due to conversion of silicon oxide to silicate, a Stabilized Lithium Metal Power (SLMP, FMC Lithium) is used in a SiO full cell. SLMP is a lithium carbonate coated micro-size lithium metal power, which is stable in air. Forney and Co-workers recently show that prelithiation of a silicon-carbon nanotube anode by SLMP improves the 1st cycle CE in a full cell from 52% to almost 100%.

Various embodiments of the invention demonstrate a SiO electrode with a high concentration (98%) of active SiO and only 2% of a PFM conductive binder without any conductive additives. This SiO electrode can be reversibly cycled for approximately 500 times with more than 90% capacity retention. The SiO electrode has a reversible capacity three times higher than that of the graphite electrode. The prelithiation of this anode using stabilized lithium metal powder (SLMP®) improves the first-cycle coulombic efficiency of a SiO/Lithium Nickel Manganese Cobalt Oxide ($LiNi_{1/3}Mn_{1/3}Co_{1/3}O_2$) (NMC) full cell from ~48% to ~90%. A lithium ion cell shows good capacity retention of more than 80% after 100 cycles at a C/3 rate.

The SiO Material and Functional Conductive Polymer Binder.

FIG. 1 illustrates (a) TEM image of the carbon-coated SiO particle, indicating the porous nature of the carbon coating. The inset shows the SEM image of a single SiO particle, both with a scale bar of 100 nm. FIG. 1(b) HRTEM image of the SiO particle. The elliptical shapes indicate the Si nano-domains within the $SiO_2$ matrix. The amorphous carbon coating is at the outer surface of the SiO particles. FIGS. 1(c) and 1(d), the observation of $SiO_2$ and carbon coating from XPS spectra was acquired simultaneously at the outer surface of the SiO materials, with a depth penetration of 2-4 nm. Open circles are experimental data, while solid lines are the results of a Gaussian deconvolution fitting.

The SiO materials are made into micron-size particles with specific surface area of 1-10 $m^2/g$, depending on the particle sizes, as opposed to the surface area of typical nano-Si materials at 20~100 $m^2/g$. Unlike Si material that exposes the reactive $Li_xSi$ phase to the electrolytes during the lithiation process, most of the reactive Si phases are enclosed in the $SiO_2$ matrix (FIG. 1a, b, d). The side reactions between electrolytes and $Li_xSi$ during charge and discharge are significantly reduced. However, the introduction of the $SiO_2$ phase and the micron size of the particle significantly reduce the electronic conduction of the particles. A carbon coating (~10 wt %, by elemental analysis) on the surface of SiO particle is used to increase the electronic conductivity (FIG. 1a, b, d). This carbon coating can be controlled to be a porous structure with a partially exposed SiO surface (FIG. 1a) to facilitate ion transport. The BET method shows that the surface area of the particle is 11.92 $m^2/g$, with a calculated particle diameter of 234 nm. A bimodal size distribution of SiO particles is shown by both particle size analysis (PSA, see FIG. 5(a)) and SEM (see FIG. 5(b)), with small particles of 1~2 μm and big particles of >10 μm. The larger surface area measured by BET also indicates the porous nature of the carbon coating on the SiO particle surface, which is further corroborated by the XPS data (O 1s and C 1s) of the pristine carbon-coated SiO particles in FIG. 1 c and d. Both the carbon coating and the $SiO_2$ are clearly detected on the particle surface.

FIG. 2 illustrates (a) the schematic of an electrode design with low concentration of functional conductive polymer binder and SiO, enabled by strong adhesion of covalent functionality and electronic conduction of functional conductive polymer binder. FIG. 2(b) the chemical structure of the PFM functional conductive polymer binder. The vertical arrows indicate the most likely chemical bonds to be broken during the ionization process in the TOF-SIMS measurement. The elliptical shadow highlights the ester group that forms adhesion bonds with the SiOH surface. FIG. 2(c) The trans-esterification reaction between the ester functional group of the PFM binder and the SiOH surface group, which provides strong adhesion, during the electrode drying process. FIG. 2(d) the TOF-SIMS result of the binder and active materials interface that shows the evidence of chemical bonding between the binder and active materials.

Although SiO has demonstrated good cyclability and low surface reaction, two major obstacles limit this material from reaching its full potential in LIBs: the excessive volume change of the micron-size particles, and the consumption of Li (low first-cycle coulombic efficiency) during the activation process. The large volume change causes the failure between the adhesive binder and the SiO materials. More conductive additives and binder have to be used to fabricate an electrode with an acceptable conductivity and mechanical strength to withstand the volume change. The use of excessive inactive materials significantly reduces the electrode level capacity close to that of the graphite-based electrode.

Thus, the functional conductive polymer binder, Poly (9,9-dioctylfluorene-co-fluorenone-co-methylbenzoic ester) (PFM, see FIG. 2b), was developed by combining adhesion and electrical conduction to provide molecular-level electronic connections between the active material and the conductive polymer matrix. The polar ester functional group, which is designed for the adhesion with the $SiO_2$ surface, is especially suitable for the SiO material. Methylbenzoic ester groups on PFM form chemical bonding with the hydroxide-terminated $SiO_2$ surface via a trans-esterification reaction (see FIG. 2c). The formation of this strong chemical bond between the SiO and PFM can be observed in the TOF-SIMS results, shown in FIG. 2d. The detection of high contents of the $SiOO(C_6H_3)^-$ species at the interface of the binder and Si confirms that the SiO active material particles are bonded with PFM, which could be further corroborated by the TOF-SIMS data shown in FIG. 6. Since the $SiO_2$ domains remain dimensionally stable in subsequent charge and discharge reactions after the first-cycle lithiation, and they are part of the stable surface of the SiO materials, the adhesion between PFM and SiO materials is much more effective than with Si in the previous report. Moreover, the use of the conductive PFM binder eliminates the use of a conductive additive. The improved adhesion between PFM and SiO, combined with the conductive nature of PFM, considerably increases the loading of active material and improves the energy density of the lithium-ion cell.

SiO/PFM Electrode Performance.

FIG. 3 illustrates (a) galvanostatic cycling performance of SiO anodes with 2%, 5%, and 10% by weight of a PFM binder using lithium counter electrodes at a C/10 rate (200 mA/g). FIG. 3(b) the same data from (a) plotted in areal loading. FIG. 3(c) comparison of the electrochemical performance of SiO electrodes made with 5% by weight of PVDF, CMC, and PFM binders using lithium counter electrodes at a C/10 rate. FIG. 3(d) 1st, 5th, and 60th cycle potential vs. the capacity curves of a 2% PFM/SiO electrode. FIG. 3(e) coulombic efficiencies of the three PFM-based cells.

Figures 8A, 8B, 8C:
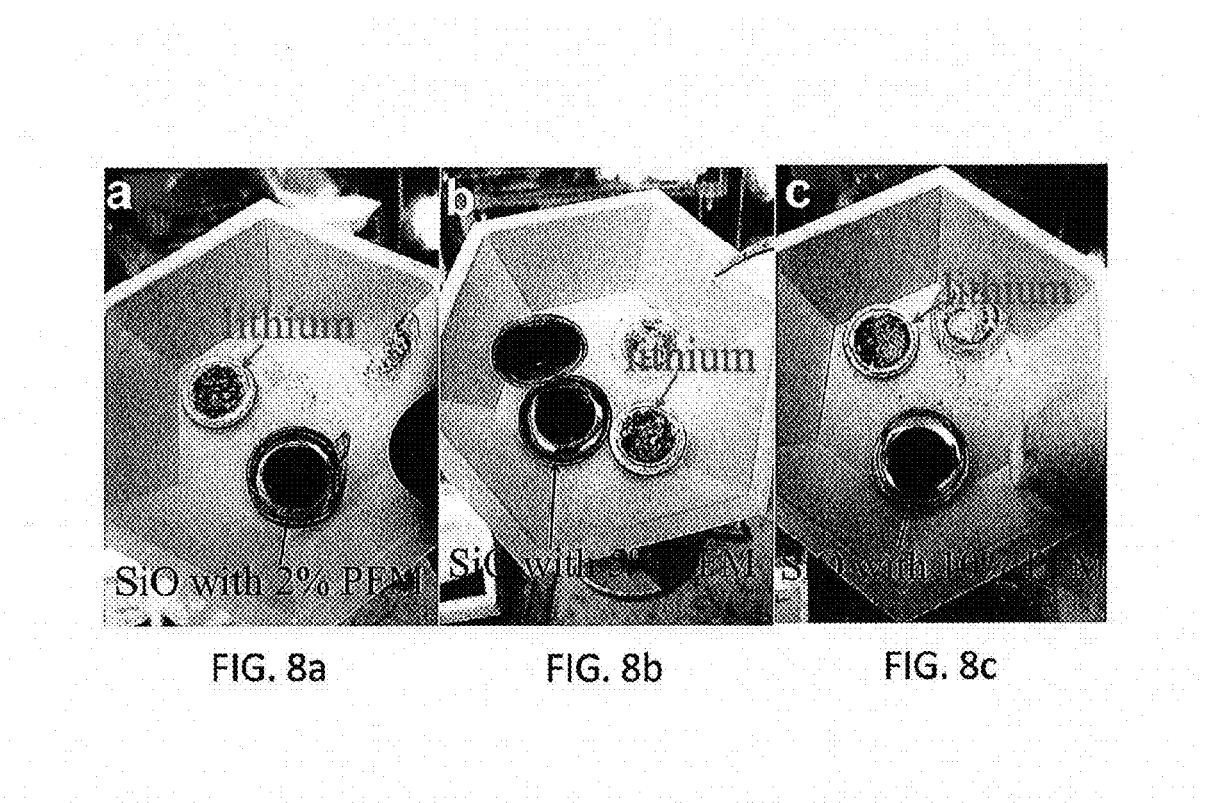
FIG. 8a, FIG. 8b, and FIG. 8c illustrate images of the SiO electrodes and lithium counter electrode after long-term cycling shown in FIG. 3, with (a) 2% PFM, (b) 5% PFM and (c) 10% PFM.

FIGS. 3(a) and 3(b) show the galvanostatic cycling performance of SiO with a lithium metal counter electrode at a C/10 (200 mA/g) rate. For all three compositions, the cell capacities initially slightly increase to a peak capacity value, then decrease to maintain a stable cycling performance. The initial capacity fluctuation is due to the wetting of the PFM-based laminate. When using a similar functional conductive polymer binder with improved polarity for wetting, cell capacity is stable, and there is no initial capacity fluctuation. The functional conductive polymer binder PFM enables SiO electrode to maintain a reversible capacity of 1,000 mAh/g for over 400 cycles with a 2% to 10% PFM binder. The minor capacity decay in all cases can be traced to the decay and dendrite formation at the lithium counter electrode, as indicated by the formation of the mossy lithium on the surface of the lithium metal after the long-term cycling shown in FIG. 8. FIG. 8 also shows that the SiO electrode maintains the mechanical integrity with only 2% PFM after extended full capacity cycling. FIG. 3b indicates the loading of the SiO electrodes. The PFM content at 2% can successfully enable long-term full capacity reversible cycling of the SiO anode with ~1 mAh/cm² areal loading. The higher the areal loading, more binder is needed to maintain stable capacity. The SiO electrode with a 10% binder is able to maintain an areal capacity of 2 mAh/cm² for about 100 cycles. This demonstrates the importance of adhesion in accommodating stress and maintaining electrode mechanical stability.

Note that most of the previous work in the development of a silicon electrode for LIBs only has an areal capacity less than 1 mAh/cm². $SiO_x/SiO_y$ bilayer nano-membranes were recently developed as anodes, which reaches a capacity of ~1200 mAh/g at C/10 for 100 cycles. A $SiO-Sn_xCo_yC_z$ anode showed a capacity of ~1000 mAh/g at C/10 for 100 cycles. Helical silicon/silicon oxide core-shell structure was used as anode on to the surface of bulk silicon, although a high specific capacity was shown (~1700 mAh/g), but only lasted for ~70 cycles. Note that the SiO anode enabled by conductive polymer binder exhibits long term cycling stability (over 500 cycles) with high capacity (900~1000 mAh/g), the loading (areal capacity of ~2 mAh/cm²) is high compared to most literature reports, and this optimum performance only requires 5% conductive polymer and 95% active SiO materials without any conductive additives.

Figures 9A, 9B:
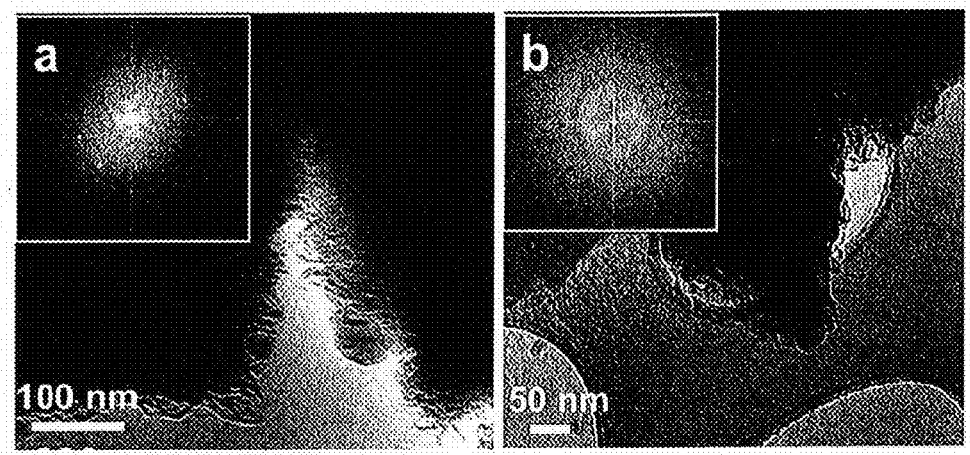
FIG. 9a, and FIG. 9b illustrate TEM images of (a) pristine SiO electrode with 2% PFM, (b) the same electrode after 30 cycles at C/10. The pristine SiO contains crystalline Si phases enclosed in the $SiO_2$ matrix, the crystalline nature of these Si phase is confirmed by the electron diffraction image shown in inset 9(a). The completely blurred electron diffraction image in inset 9(b) shows that the crystalline is converted to amorphous phase after 30 cycles at C/10.
Figure 10A:
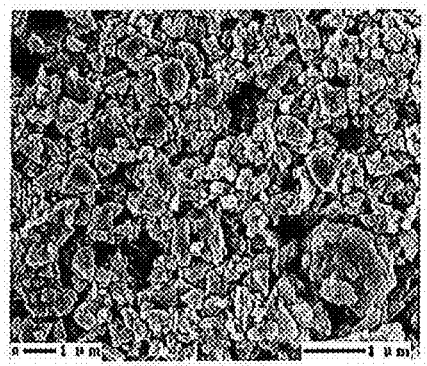
FIG. 10a, FIG. 10b, FIG. 10c, FIG. 10d, FIG. 10e and FIG. 10f illustrate SEM images of SiO electrode with (a) 2% PFM as fabricated (b) 2% PFM after 1 cycle (c) 5% PFM as fabricated (d) 5% PFM after 1 cycle (e) 10% PFM as fabricated (f) 10% PFM after 1 cycle.
Figure 10B:
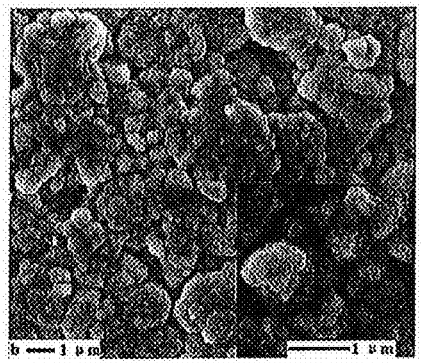
Figure 10C:
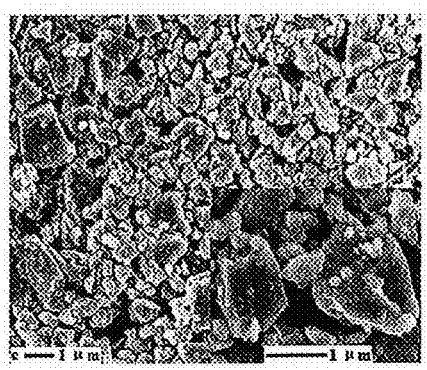
Figure 10D:
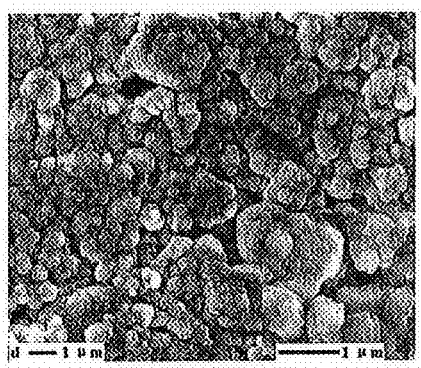
Figure 10E:
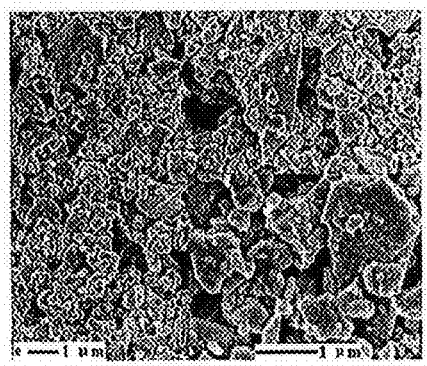
Figure 10F:
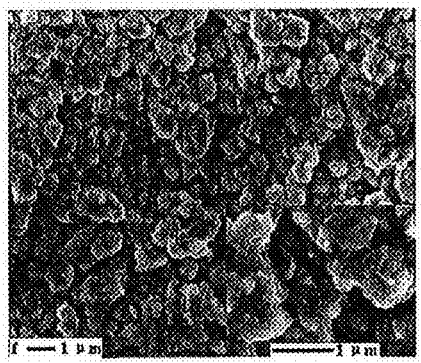

Compared to conventional binders, the advantage of the conductive PFM binder is further confirmed in FIG. 3c. The PVDF binder has no electric conductivity, nor does it chemically bond with SiO, therefore fast fading occurs and the capacity drops to almost zero after 20 cycles. The CMC binder has carboxylate functional groups that are known to form chemical bonding with the surface hydroxide group on Si-based materials, however, the CMC binder lacks electric conductivity. The bonding with only 5% CMC binder in the laminate was not able to maintain good electrochemical performance. The SiO electrode only needs as little as 2% functional conductive PFM binder to outperform most other binders. The voltage curves of the fifth cycle and sixtieth cycles almost overlap, indicating minimum capacity decay during cycling. FIG. 9 shows the TEM morphologies of pristine SiO electrodes with 2% PFM and after 30 cycles at C/10. The crystalline phase disappears after cycling, corresponding to the transition of the crystalline silicon to an amorphous phase, which is confirmed by the completely blurred electron diffraction image. The TEM image after 30 cycles (FIG. 9(b)) also shows that the PFM polymer indeed maintains the mechanical integrity of electrodes throughout the battery operation. However, the TEM images of the surface of the particles before and after cycling are similar, without a thick layer of electrolyte-decomposed products on the cycled SiO particles. The SEM electrode morphologies of the three PFM-based electrodes were also characterized and are shown in FIG. 10. The polymer network is very important to maintain the structure of the electrode, which was also shown recently by other binder chemistry. An apparent large porosity is also shown in the pristine electrode image, and electrolyte decomposition clearly occurs after one cycle. The SEM images show that the solid electrolyte interphase (SEI) products are not excessive. This controlled SEI formation plays an important role for the long-term reversible cycling shown in FIG. 3.

FIG. 4 illustrates (a) schematics of the utilization of SLMP for the SiO electrode. SLMP particles are loaded on to the SiO anode. Rolling compression was used to crush the $Li_2CO_3$ shell of SLMP to release lithium metal and laminate it on the surface of SiO electrode. This process is called SLMP activation. FIG. 4(b) SLMP particles loaded on the SiO electrode before activation. The inset shows the SEM image of a single SLMP particle. FIG. 4(c) The SiO electrode surface after electrolytes are added onto the SiO electrode with activated SLMP after 12 hours. This shows the disappearance of SLMP and indicates the successful prelithiation of the SiO electrode. FIG. 4(d) SiO/NMC full cell performance with or without the SLMP capacity-enhancement additive, two cycles at C/20, two cycles at C/10, and then C/3. FIG. 4(e) the first cycle voltage curves of the two cells.

With 5% PFM, the CE of the cell is as high as 99.62% at the sixtieth cycle. High CE is critical for the long-term stable cycling of the anode electrode and better capacity retention at the full cell level. The first cycle CE is only ~65% (see Table 1), which is comparable to its value in most of the literature value. Besides the formation of SEI, lithium reacts and converts silicon oxide to silicate, which contributes to the large first cycle irreversible capacity. This is a detrimental problem in a lithium-ion cell, since the lithium ions from the cathode will be irreversibly consumed. To compensate for the irreversible capacity loss in the first cycle, stabilized lithium metal powder (SLMP®) is used to prelithiate the SiO anode in the SiO/Lithium Nickel Manganese Cobalt Oxide ($LiNi_{1/3}Mn_{1/3}Co_{1/3}O_2$) (NMC) full cell. SLMP is a micro-size lithium metal powder with ~2 wt % lithium carbonate surface coating (see FIG. 4b). SLMP prelithiation of a silicon-carbon nanotube anode was shown to improve the first cycle CE in a full cell from 52% to almost 100%. A recent study from our group also showed that prelithiation of graphite effectively compensated for the first-cycle loss and formed a fully functional SEI on the graphite anode, in both a half cell and a graphite/NMC full cell.

Full Cell Performance Improved by SLMP.

SLMP was directly loaded on top of the dried SiO anode, which proved to be a simple and effective way of applying SLMP. The amount of loaded SLMP was calculated to theoretically eliminate all the irreversible capacity in the first cycle. A calendar machine was used to pressure-activate the SLMP particles (see FIG. 4a). This operation breaks the lithium carbonate ($Li_2CO_3$) shell and allows lithium to be in direct electrical contact with the SiO materials in the anode. The shape change of SLMP could be seen before (see FIG. 4b) and after (see FIG. 11(d)) pressure-activation of the SLMP. When it makes contact with the electrolyte, the SLMP on the SiO electrode releases lithium which spontaneously migrates to SiO. SEI formation is induced, and partial lithiation of the SiO also occurs, indicated by the disappearance of SLMP in FIG. 4c. A 96-hour rest period was used to allow the crushed SLMP to fully prelithiate the SiO anode before current-driven charging of the cells. As a good control, the SiO/NMC full cell without SLMP was also rested for 96 hours before cycling. Both full cells were put in a formation process consisting of two cycles at C/20 and two cycles at C/10 prior to C/3 cycling. Apparent improvement was shown for the SLMP-loaded full cells. The first cycle CE increased from 48% to ~90% with the SLMP (shown in the inset of FIG. 4d). SLMP enabled the NMC/SiO full cell to maintain a reversible capacity of ~110 mAh/g after more than 100 cycles at C/3. Part of the lithium in the NMC cathode was irreversibly consumed by SiO without SLMP prelithiation. The full cell without SLMP prelithiation started only with a capacity of ~80 mAh/g and dropped to ~50 mAh/g after 100 cycles.

The first cycle voltage curves of the full cells are shown in FIG. 4e. Compared to the regular cell without SLMP, the voltage profile at both ends (start of charge and end of discharge) are distinctly different, indicating different lithiation and delithiation of SiO during these two stages. In the first cycle charge process, SLMP eliminated the needs for SEI formation and silica conversion, so the curve goes directly to the anode lithiation voltage region. When SLMP is not used, this charging curve shows a long multi-plateau curvature accounting for a capacity of ~40 mAh/g, which is typical for irreversible processes of SiO conversion and SEI formation. Not only is the cell capacity stable during cycling, the voltages between charge and discharge remain stable from the first cycle to the fortieth cycle (FIG. 13(b)). The excellent electrochemical performance demonstrates the superb SiO surface and electrode mechanical stability. The SEM image of the SiO electrode rested for 96 hours in a full cell without SLMP is shown in FIG. 13(c). Compared to the pristine electrode (see FIG. 10), no apparent morphology change occurred during this equilibration period. When the SiO/NMC full cell is loaded with SLMP on the SiO electrode, the SEM image in FIG. 13(d) shows a clear SEI formation due to the electrolyte decomposition after 96-hour rest period. The SEI formation and partial lithiation of the SiO particles could be further confirmed by the particle size analysis. The size of SiO particles after resting in SiO/NMC/SLMP cell (see FIG. 13(f)) shows a bigger value compared to the control sample without SLMP (see FIG. 13(e)).

Discussion

In a typical Si system, the surface Si element participates in the alloy reaction with the lithium elements. The potential bond breaking between the Si surface and binder weakens the adhesion over cycling, so a high concentration of binder is required. However, in the SiO system, the nano-Si domains are distributed in the $SiO_2$ matrix. The surface is predominately $SiO_2$, and it does not participate in the alloy reaction; rather, it maintains the surface functional bonding during cycling. The existence of the enhancing $SiO_2$ domains on the surface allows the use of less binder but achieve similar binding strength. Because of the existence of the stable $SiO_2$ phase, the binder functions very effectively during cell operation.

Historically, a special electrode design has been required to accommodate the large volume change of Si during cycling to build a higher-loading electrode. In this invention, SiO, with nano-active Si domains dispersed in the silica as a buffer phase, not only has improved dimensional stability and reduced side reactions, but also improves adhesion in combination with the functional conductive polymer binder. The ester bond between the adhesion functional group of the PFM and $SiO_2$ matrix surface (FIG. 2c) is maintained throughout the lithiation and delithiation process. Therefore, A high-concentration and areal-loading SiO (~1000 mAh/g) electrode can be achieved, as shown in FIG. 3. The SiO electrodes with 2% to 10% PFM functional conductive polymer binder have at least three times more practical energy density than that of a state-of-the-art graphite electrode.

The calculated energy densities of the NMC/SiO full cell (see FIG. 14) indicate that the application of SLMP to prelithiate SiO enables 20%-30% improvement compared to the graphite/NMC full cell. However, without SLMP prelithiation, the SiO/NMC full cell only delivers ~70% of the capacity of the state-of-the-art graphite/NMC due to the consumption of lithium during SiO activation. SiO has attracted more and more attention recently as promising anode candidate for LIBs, however, high active material content and the compensation for the first cycle irreversible capacity, are critical to achieve the full potential of this material.

In conclusion, SiO electrodes were cycled in stable and high gravimetric capacity (>1000 mAh/g) using a functional conductive polymer binder in composite electrodes. Compared to other conventional binders such as PVDF and CMC, the conductive functional polymer binder used in the SiO system shows obvious advantages because of its electrical conductivity and strong adhesion. The loading of SiO in the electrode can be as high as 98 wt %, and the half cell with this laminate shows a capacity higher than 1000 mAh/g up to ~500 cycles. The use of SLMP improves the first cycle CE from ~48% to ~90%, and greatly enhances the energy density of the SiO/NMC full cell. The combined strategy of using both a functional conductive polymer binder and an SLMP prelithiation solves the volume expansion and low first-cycle coulombic efficiency problems, leading to a high-energy lithium-ion chemistry.

Experimental

Materials.

All reagents were purchased from Sigma-Aldrich or TCI America and used without further purification. Carbon-coated SiO material is obtained from Hydro-Quebec. Stabilized Lithium Metal Power (SLMP) is obtained from FMC Corporation. Lithium Nickel Manganese Cobalt Oxide ($LiNi_{1/3}Mn_{1/3}Co_{1/3}O_2$) cathode is from Umicore. Celgard 2400 separator is obtained from Celgard. Lithium-ion electrolyte were purchased from BASF, including 1 M $LiPF_6$ in ethylene carbonate, diethyl carbonate (EC/DEC=3/7 w/w) containing 30 wt % fluoroethylene carbonate (FEC).

Electrode Lamination and Cell Testing.

The slurry preparation, electrode coating and cell fabrication can be found in the literature. SLMP was loaded on top of the SiO electrode or copper foil disk evenly by spreading out method. The electrode with SLMP was then calendared with rolling press (EQ-MR 100A from MTI Corporation) to activate SLMP. NMC cathode is composed of 8% KF1100 PVDF, 7% AB and 85% NMC active particles on Al current collector. The performance of the assembled 2325 coin cells was evaluated with Maccor Series 4000 Battery Test system in a thermal chamber at 30° C. The cut-off voltage of cell testing is between 1.0 V and 0.01V for half cell, and 3.0 V to 4.2 V for SiO/NMC full cell, assuming a theoretical value of 2,000 mAh/g for SiO and 150 mAh/g for NMC.

FIG. 5 illustrates (a) particle size analysis (PSA) and (b) SEM of the pristine SiO particles. The particle sizes characterized using PSA and SEM are consistent, with a bimodal distribution. The smaller particles have a size at ~1 µm, the bigger particles have a size ~10 µm. Although a another technique BET, which is characterizing particle sizes based on the surface area, indicates a particle size of 234 nm. We propose that the apparent smaller size characterized by BET is from the porous carbon coating, which contributes to a larger surface area.

Figure 6A:
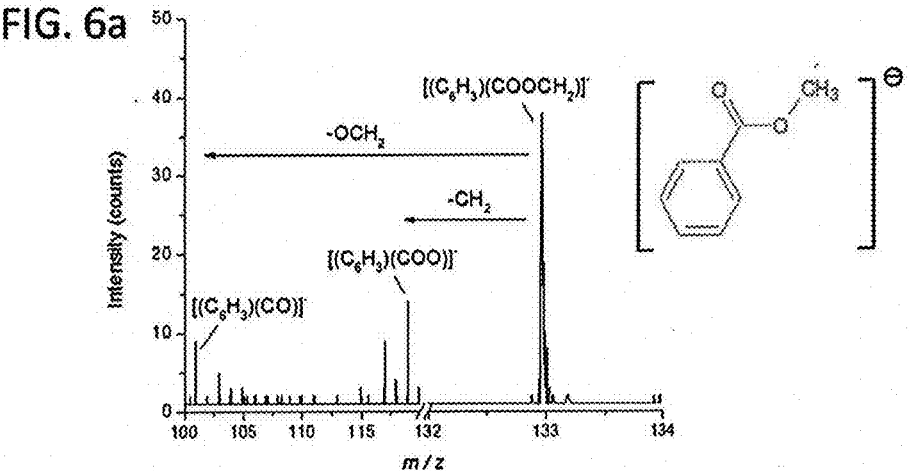
FIG. 6a, FIG. 6b, and FIG. 6c illustrate TOF-SIMS spectra showing the structural units from PFM binder.
Figure 6B:
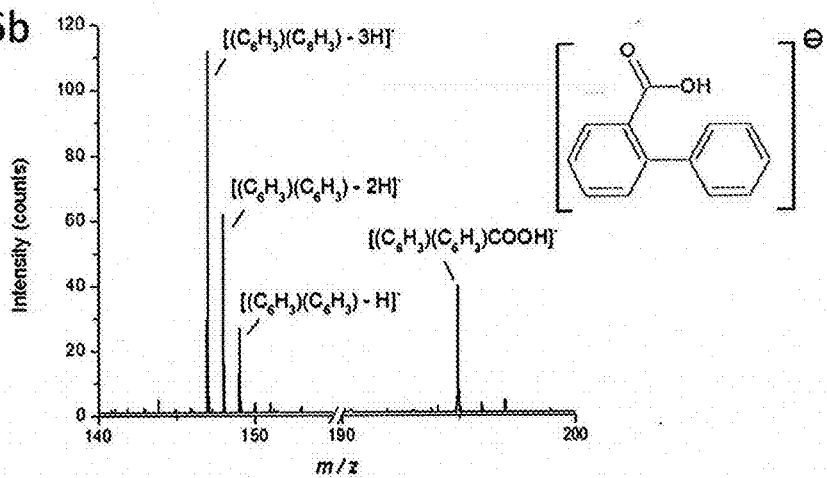
Figure 6C:
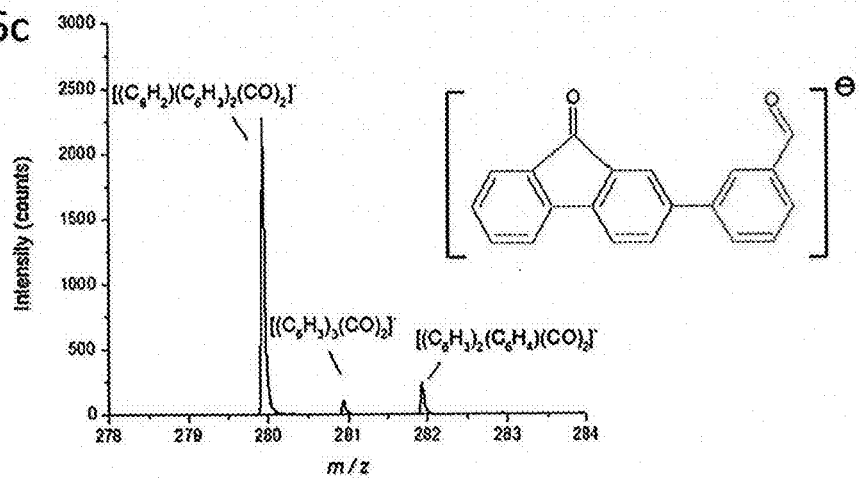

FIG. 6 illustrates TOF-SIMS spectra showing the structural units from PFM binder.

Figure 7:
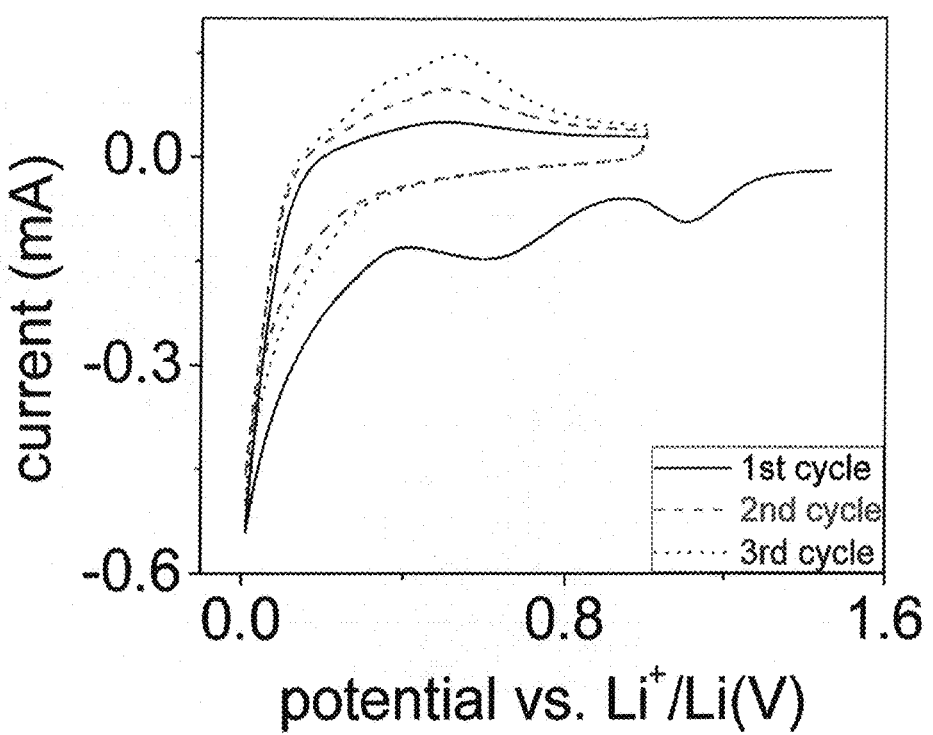
FIG. 7 illustrates cyclic voltammetry of SiO/PFM (98/2, w/w) electrode.

FIG. 7 illustrates cyclic voltammetry of SiO/PFM (98/2, w/w) electrode. Cyclic voltammetry of the SiO was evaluated with 2% PFM binder, using lithium as counter and reference electrode in coin cell. The first onset in the cathodic scan can be observed at ~1.1 V, this peak did not show up in the subsequent cycles, which can be assigned as formation of a solid state electrolyte (SEI) due to the decomposition of electrolytes. Another signal in the $1^{st}$ cycle cathodic scan appeared at ~0.6 V, this peak disappeared in the following cycles, which corresponds to the irreversible lithiation of $SiO_2$ phase to lithium silicate. The main cathodic peak in the $1^{st}$ cycle ranges from 0.25 V to 0.003 V and is associated with the formation of the amorphous $Li_xSi$ phase. The corresponding delithiation of this phase appeared at ~0.5 V in the anodic scan, indicating the reversibility of this process.

TABLE 1

Electrochemical data of the SiO electrodes with different binders in lithium counter electrode cells.

|  |  | 5% PFM | 5% PVDF | 5% CMC |
|---|---|---|---|---|
| $1^{st}$ cycle | $Q_c^a$ (mAh/g) | 1,080.8 | 924.5 | 1,030.6 |
|  | $\eta^b$ (%) | 67.96 | 57.13 | 71.95 |
| $5^{th}$ cycle | $Q_c^a$ (mAh/g) | 1,179.5 | 329.6 | 963.8 |
|  | $\eta^b$ (%) | 97.92 | 81.84 | 95.56 |
| $60^{th}$ cycle | $Q_c^a$ (mAh/g) | 1,144.0 | 22.0 | 331.8 |
|  | $\eta^b$ (%) | 99.62 | $X^c$ | 96.31 |

$^a$charge (delithiation) capacity
$^b$Coulombic efficiency
$^c$capacity fades to a level that the efficiency data are not meaningful Table 1 shows the delithiation capacities and CEs of SiO electrodes with different types of binders. Due to the initial activation reactions between lithium and silicon oxide phase, the SiO material has a low initial CE, a $1^{st}$ cycle CE as low as 57.1% is obtained with PVDF. The efficiency at the $60^{th}$ cycle is not shown since the cell failed to cycle after the first few cycles. The CMC binder gives an impressive $1^{st}$ cycle CE of ~72%, however, the CE is only 96.3% at $60^{th}$ cycle and the capacity decays to 331.8 mAh/g. For the three PFM/SiO electrodes with different PFM compositions (data for 2% and 10% binder not shown), the $1^{st}$ cycle CEs are 66.3% with 2 wt % PFM binder, 65.2% with 5 wt % PFM binder and 65.2% with 10 wt % PFM binder, respectively. Thus the amount of PFM in the electrode only impacts the CE slightly. With 5% PFM, the CE of the cell is as high as 99.62% at $60^{th}$ cycle. High CE is critical for the long-term stable cycling of the anode electrode and better capacity retention at the full cell level.

TABLE 2

$1^{st}$ cycle capacities and efficiencies assuming different by-products.

| Final product | Reaction with Li | Discharge capacity (mAh/g) | Charge capacity (mAh/g) | $1^{st}$ cycle efficiency |
|---|---|---|---|---|
| $SiO_2$ | NO REACTION | 1340.1 | 1340.1 | 100% |
| $Li_2Si_2O_5$ | $1.68Li + SiO_2 = (1/5)Li_{4.4}Si + (2/5)Li_2Si_2O_5$ | 1851.7 | 1608.1 | 86.84% |
| $Li_2SiO_3$ | $2.8Li + SiO_2 = (1/3)Li_{4.4}Si + (2/3)Li_2SiO_3$ | 2192.8 | 1786.6 | 81.46% |
| $Li_6Si_2O_7$ | $3.6Li + SiO_2 = (3/7)Li_{4.4}Si + (2/7)Li_6Si_2O_7$ | 2436.5 | 1914.5 | 78.58% |
| $Li_4SiO_4$ | $4.2Li + SiO_2 = (1/2)Li_{4.4}Si + (1/2)Li_4SiO_4$ | 2619.2 | 1949.2 | 74.42% |
| $Li_2O$ | $8.4Li + SiO_2 = Li_{4.4}Si + 2Li_2O$ | 3898.4 | 2680.1 | 68.75% |

FIG. 8 illustrates an image of the SiO electrodes and lithium counter electrode after long-term cycling shown in FIG. 3, with (a) 2% PFM, (b) 5% PFM and (c) 10% PFM. In all the three different cells after ~500 cycles, lithium metal shows the apparent dendrite growth, which is the major reason of the capacity decay shown in FIG. 3. All the SiO electrodes show a good electrode integrity, even with only 2% PFM binder.

These opened cells are from long-term cycling, which gave the cell data presented in FIG. 3. Two important phenomena are shown here. First, these SiO/PFM electrodes maintain the integrity after ~500 cycles at C/10 (about 7 months cycling), even with only 2% binder, which further corroborated the improved adhesion between SiO and PFM conductive polymer binder, as schematically illustrated in FIG. 2. Second, there is apparent lithium dendrite formation on the lithium side, we attribute that most of the capacity decay in the long-term cycling to the lithium side, not from the SiO/PFM side.

FIG. 9 illustrates TEM image of (a) pristine SiO electrode with 2% PFM, (b) the same electrode after 30 cycles at C/10. The pristine SiO contains crystalline Si phases enclosed in the $SiO_2$ matrix, the crystalline nature of these Si phase is confirmed by the electron diffraction image shown in inset 9(a). The completely blurred electron diffraction image in inset 9(b) shows that the crystalline is converted to amorphous phase after 30 cycles at C/10.

FIG. 10 illustrates SEM images of SiO electrode with (a) 2% PFM as fabricated (b) 2% PFM after 1 cycle (c) 5% PFM as fabricated (d) 5% PFM after 1 cycle (e) 10% PFM as fabricated (f) 10% PFM after 1 cycle.

FIG. 11 illustrates (a) SEM image of the SLMP. FIG. 11(b) image of SLMP particles, 11(c) SLMP particles loaded on the SiO electrode before activation. FIG. 11(d) The SiO electrode surface after SLMP activation. FIG. 11(e) The SiO electrode surface after electrolytes are added onto the SiO electrode with activated SLMP after 12 hours. FIGS. 11(b-e) are optical microscopy images of the SLMP.

FIGS. 11a and 11b show the SEM and optical microscope images of the SLMP particles. The shape change of SLMP could be seen before (FIG. 11c) and after (FIG. 11d) pressure-activation of SLMP on the SiO electrode. When it makes contact with the electrolyte, the SLMP on the SiO electrode releases lithium which spontaneously migrate to SiO. SEI formation is induced and partial lithiation of the SiO also occurs. The disappearance of the SLMP on the SiO electrode could be confirmed by comparing the optical microscope images of the SLMP-loaded SiO electrode after resting with drops of electrolytes (FIGS. 11d and 11e).

Figure 12:
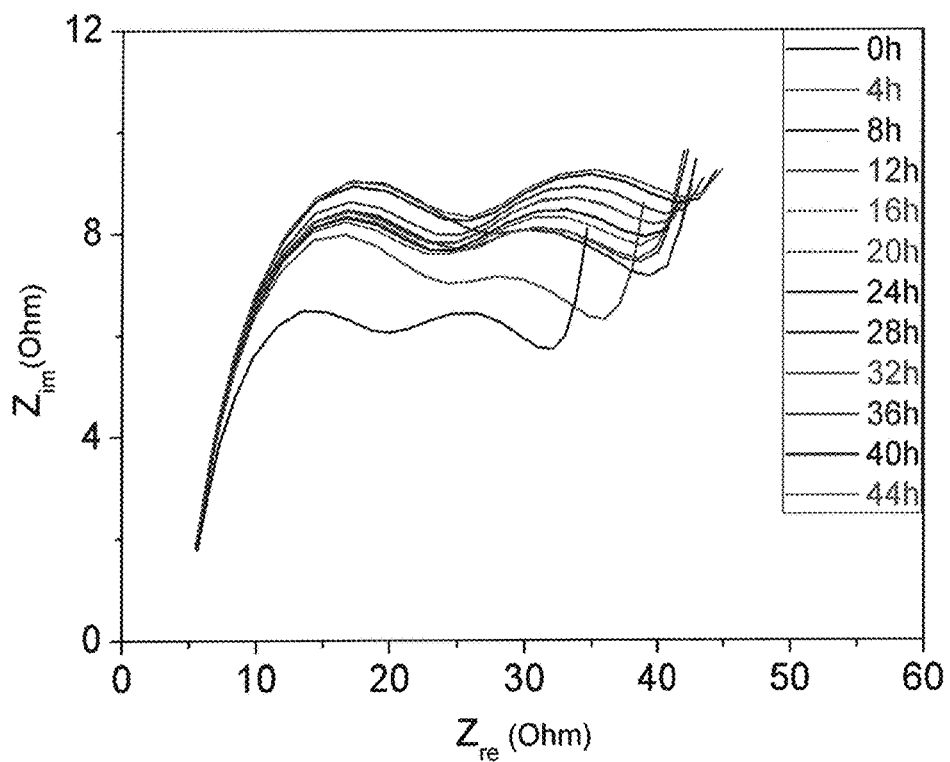
FIG. 12 illustrates a cell impedance vs. rest time for the NMC/SiO full cell with SLMP loaded on top of SiO anode.

FIG. 12 illustrates a cell impedance vs. rest time for the NMC/SiO full cell with SLMP loaded on top of SiO anode. To confirm the SEI formation and cell equilibration in the period of 96 hours holding, impedance measurements were conducted with a two-electrode cell geometry using the SLMP-loaded NMC/SiO full cell. A Bio-Logic VMP3 multichannel galvanostat-potentiostat was used to collect the frequency data, the explored frequency range was from 10 mHz to 100 kHz under ac stimulus with 10 mV of amplitude and no applied voltage bias. As shown in FIG. 12, the cell impedance was stabilized after 12 hours equilibration. This confirms that the 96 hours equilibration time before cycling is enough to stabilize the SLMP-loaded cell.

FIG. 13 illustrates (a) the voltage curves of SiO/NMC full cell with or without the SLMP prelithiation, during cell equilibration before cycling of SiO electrode with (b) $1^{st}$, $10^{th}$ and $40^{th}$ cycle voltage curves of the SiO/NMC full cell with SLMP. FIG. 13(c) illustrates SEM images of the SiO anode equilibrated in a full cell without SLMP. FIG. 13(d) illustrates SEM image of the SiO anode equilibrated in a full cell with SLMP for 96 hours. The insets show magnified images of a single SiO particle. The scale bars: 1 μm for the larger photos, with 100 nm for the inset images. Particle size analysis based on the SEM of FIG. 13(e) SiO electrode rest without SLMP in full cell, FIG. 13(f) SiO electrode rest with SLMP in full cell.

The voltage curves during cell equilibration are shown in FIG. 13(a). The SiO/NMC full cell without SLMP started at 0.18 V and was stable at this voltage for 96 hours. The SiO electrode starting potential before lithiation was about 3 V versus $Li/Li^+$, which is similar to the NMC electrode. The combination of SiO anode with NMC cathode gives an initial low voltage of an unformed cell. However, when the SLMP was coated and activated onto the anode, partial lithiation of the SiO by the SLMP brought the potential of the SiO electrode down to about 0.1 V $Li/Li^+$. Therefore, the open circuit voltage (OCV) of the SLMP-doped cell is about 3 V. To further confirm that this 96-hour-equilibration period is appropriate for SLMP prelithiation of the SiO anode, the impedance of the full cell loaded with SLMP was monitored during this 96-hour equilibration period, as shown in FIG. 13. The cell impedance was stabilized after 12 hours, indicating that no future lithiation is happening to the SiO. The particle size analysis in 13(e) and 13(f) further confirms the effect of SLMP prelithiation, which gives a bigger particle size shown in 13(f). SEI formation and partial lithiation of the SiO particles may cause the growth of the particle.

TABLE 3

Electrochemical performance characteristic of the SiO/NMC full cells.

|  |  | No SLMP | with SLMP |
|---|---|---|---|
| $1^{st}$ cycle | $Q_d^a$ (mAh/g) | 85.6 | 146.5 |
| (C/20) | $\eta^b$ (%) | 48.45 | 89.77 |
| $5^{th}$ cycle | $Q_d^a$ (mAh/g) | 72.8 | 132.6 |
| (C/3) | $\eta^b$ (%) | 95.91 | 94.27 |
| $40^{th}$ cycle | $Q_d^a$ (mAh/g) | 63.4 | 123.0 |
| (C/3) | $\eta^b$ (%) | 99.69 | 99.65 |

$^a$discharge capacity
$^b$Coulombic efficiency

The CEs at $5^{th}$ and $40^{th}$ cycle are quite similar for the cells with or without SLMP. The similarity of CEs indicates that the introduction of SLMP into the cell does not interfere with the battery's subsequent performance. The data in Table 3, as well as the plots shown in FIG. 5, indicate that the major performance improvement using SLMP lies on the elimination of the $1^{st}$ cycle irreversible capacity. Starting from $2^{nd}$ cycle, the well-designed electrode based on conductive polymer binder/SiO enables a very stable cycling performance in the full cell configuration.

Figure 14:
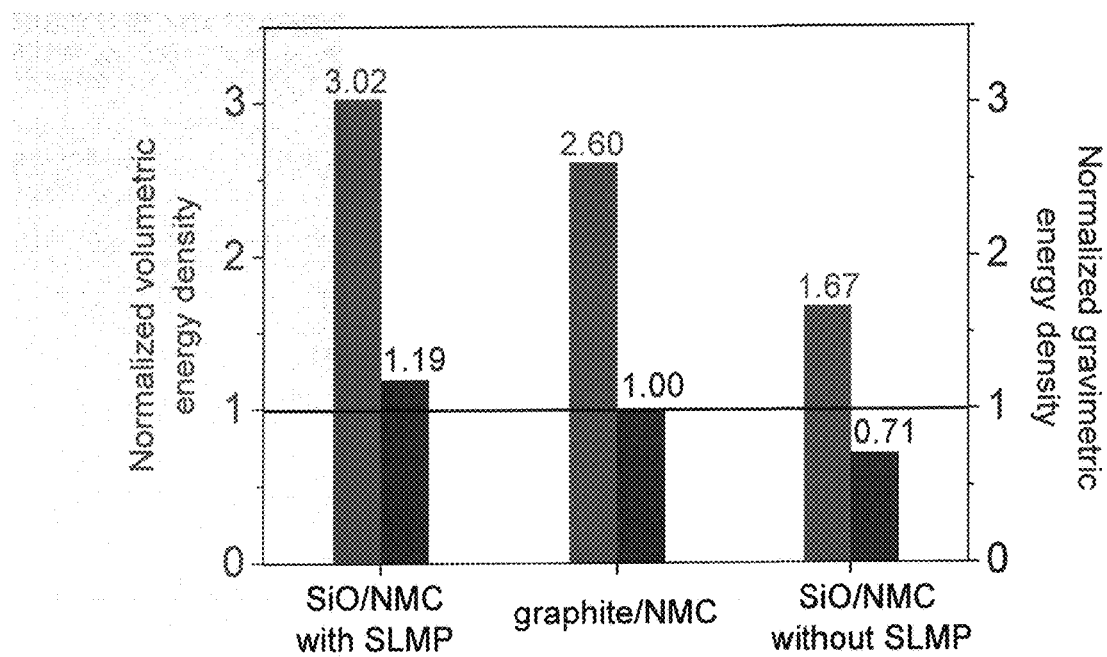
FIG. 14 illustrates a normalized energy densities (based on graphite/NMC chemistry) of a SiO/NMC full cell with and without SLMP, and a graphite/NMC full cell.

FIG. 14 illustrates normalized energy densities (based on graphite/NMC chemistry) of a SiO/NMC full cell with and without SLMP, and a graphite/NMC full cell.

FIG. 14 shows that the SiO/NMC with SLMP capacity-enhancement additive demonstrated enhanced energy densities at the full cell level. All the energy density data were normalized to the graphite/NMC full cell. PFM enables the use of a very high concentration of SiO active materials in the electrode level. The application of SLMP to prelithiate SiO compensate for the first-cycle loss and further improves the energy density at around 20%~30%. When comparing the graphite/NMC cell to the SiO/NMC cell without SLMP, it shows that without SLMP prelithiation, the SiO/NMC cell only delivers ~70% of the capacity of the state-of-the-art graphite/NMC due to the consumption of lithium during SiO activation. SiO has attracted more and more attention recently as promising anode candidate for LIBs, however, high active material content and the compensation for the $1^{st}$ cycle irreversible capacity, are critical to achieve the full potential of this material.

Figure 15:
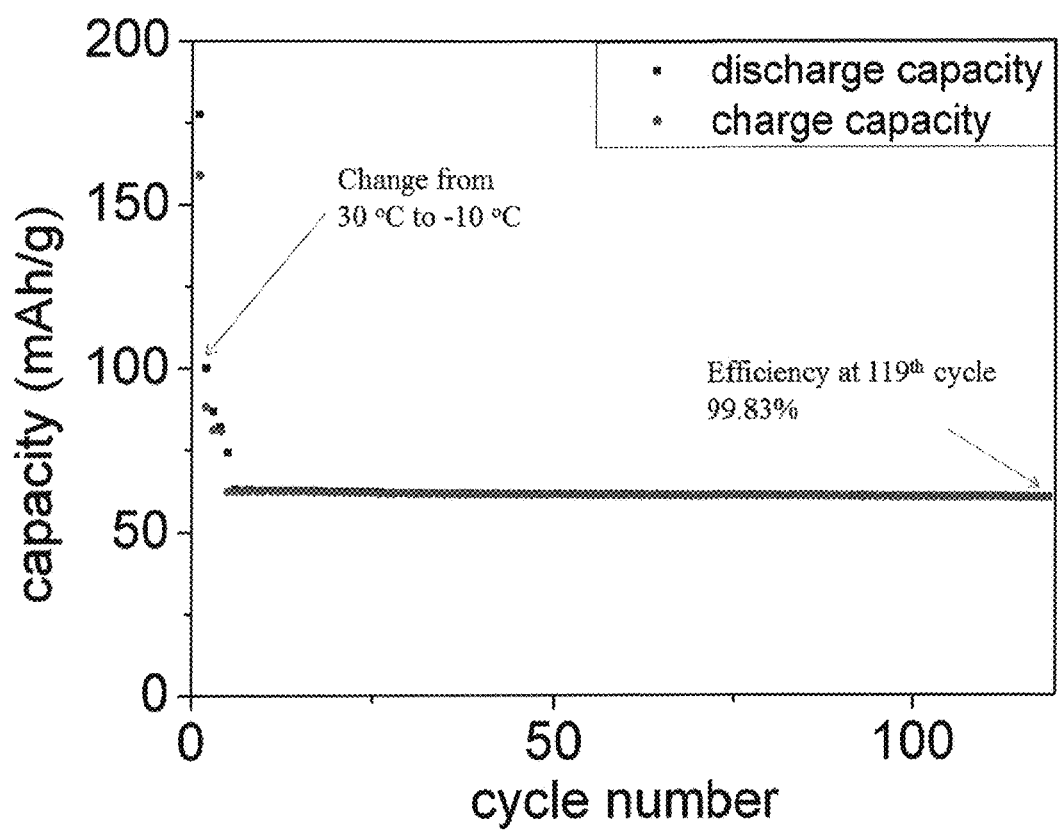
FIG. 15 illustrates low temperature cycling performance of NMC/SiO full cell with SLMP, C/20 for 2 cycles, C/10 for 2 cycles and C/3. The temperature was changed from 30° C. to −10° C. after $1^{st}$ cycle.

FIG. 15 illustrates low temperature cycling performance of NMC/SiO full cell with SLMP, C/20 for 2 cycles, C/10 for 2 cycles and C/3. The temperature was changed from 30° C. to −10° C. after $1^{st}$ cycle.

The work temperature for LIBs is an important parameter, especially for the application in EV/PHEV. A preliminary study on the low-temperature performance of the LIBs is conducted using NMC/SiO full cell loaded with SLMP at −10° C. As shown in FIG. 15 here, even at −10° C., the cell could still deliver almost half of the capacity (see FIG. 4(*d*)), which negligible capacity decay after 100 cycles at C/3 (50 mA/g).

Introduction of a Porous Electrode Structure.

In another embodiment, we demonstrate that a highly porous electrode (laminate) will buffer the volume change of individual Si particles or SiO particles, which will help to maintain the mechanical and electronic integrity of a Si/SiO electrode. We demonstrated a variety of different methods to generate porosities (ranging from micron to nano-size pores). An elegant, simple, low cost, scalable and versatile approach was demonstrated to obtain Si/SiO electrodes with high-porosity. The property gain in terms of electrochemical performance (high areal capacity with high current density) is achieved, which further demonstrates that high-porosity is a key factor to improve the loading of Si/SiO electrodes. Furthermore, using a similar protocol, a high energy density lithium iron phosphate cathode is also fabricated, assembled and tested, which shows very encouraging data.

The electrodes and methods disclosed herein can be applied to many battery types, including primary and secondary batteries. Such as lithium ion, sodium ion, magnesium ion, aluminum ion, proton, or hydroxyl ion battery. Several examples include lithium primary batteries, lithium ion batteries, alkaline batteries, nickel metal hydride batteries, nickel-cadmium batteries, and the like.

One embodiment is described for lithium-ion batteries. Both a cathode (such as lithium iron phosphate) and an anode (such as graphite and silicon) can use the following method which has great potential to serve as an easy, scalable, economic and versatile method to generate porosities in the electrodes/laminates of LIBs.

The idea is to add additives (either soluble or non-soluble in the slurry solvent) when making slurries, and fabricate an electrode laminate as normal. Once the electrode laminate is dried, the additives are dissolved in a solvent that does not dissolve the polymer binder and not damage the electrode laminate. Once the additive is removed, pores (porosity) will be generated in place of the dissolved additive. In various embodiments, the proposed combinations of additive/slurry solvent/etching solvent/polymer binder are shown in Table 4.

TABLE 4

Various combinations of additives, binders, slurry solvents and etching solvents to generate porosities.

| combination | additives | polymer binder | slurry solvent | etching solvent |
|---|---|---|---|---|
| 1 | any water-soluble inorganic salts with micron or nano size, such as lithium chloride, sodium chloride, potassium chloride, lithium carbonate, sodium carbonate, potassium carbonate, etc. | polyvinylidene fluoride (PVDF), styrene butadiene rubber (SBR), poly(pyrene methacrylate) (Ppy), 9,9-dioctylfluorene-co-fluorenone-co-methylbenzoic ester (PFM) etc. which are organic solvent soluble but water non-soluble | organic solvent such as toluene, chlorobenzene, N-methylpyrrolidone (NMP), | water |
| 2 | wax-like organic compound | Carboxymethyl cellulose (CMC), polyacrylic acid (PAA), which are only water soluble but organic solvent non-soluble | water | organic solvent such as hexane, toluene |

In one embodiment, the combination 1 in Table 4 is utilized for the porosity generation in electrodes for LIBs to illustrate the beneficial effect of the porosity generation. Sodium chloride (NaCl) is chosen as the additive in the slurry preparation step. NaCl (table salt) is inexpensive and abundant, and the etching process is environmentally friendly. For example, NaCl is removed from a dried electrode using water to generate saline as a byproduct. A conductive polymer binder such as PFM is used. Carbon-coated silicon monoxide (SiO) is obtained from Hydro-Quebec. Chlorobenzene is used as the solvent to prepare the slurry because PFM is very soluble in chlorobenzene, and it is a non-solvent for NaCl. Commercial NaCl is typically composed of NaCl particles in millimeter size, therefore, high speed ball-milling is used to break the NaCl particles into micron-sizes.

Figures 16A, 16B:
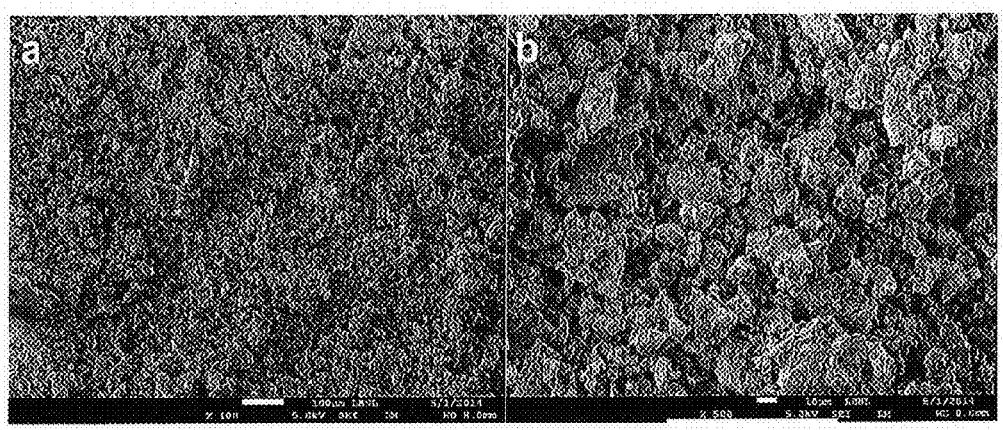
FIG. 16a and FIG. 16b illustrate SEM images of a ball-milled NaCl particle, the scale bar is 100 µm for (a), and 10 µm for (b). The ball-milled NaCl particle, indicates typical sizes in the range of 10~50 µm.
Figure 19A:
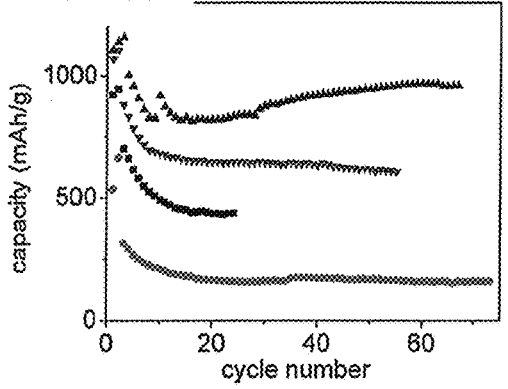
FIG. 19a, FIG. 19b, FIG. 19c, FIG. 19d, FIG. 19e and FIG. 19f illustrate (a) specific capacity and (b) areal capacity vs. cycle number of the SiO/PFM electrode, with 10% or 30% NaCl after washing, (c) $1^{st}$ cycle and (d) $20^{th}$ cycle voltage curves of SiO/PFM with 10% NaCl, (e) $1^{st}$ cycle and (f) $20^{th}$ cycle voltage curves of SiO/PFM with 30% NaCl. Using EC/DEC=3/7, 30% FEC and 1M $LiPF_6$ as electrolytes.
Figure 19B:
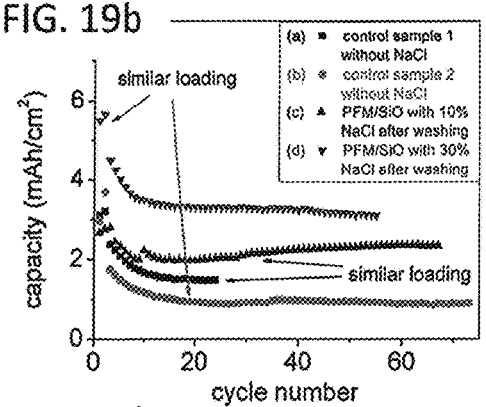
Figure 19C:
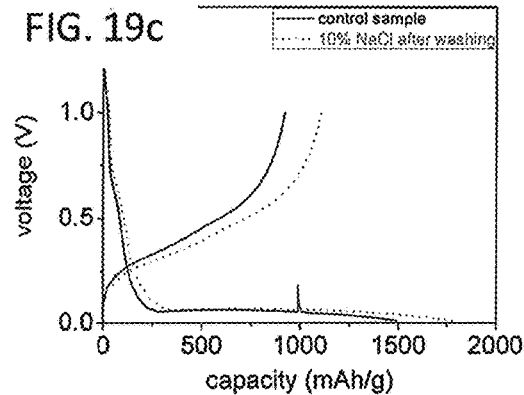
Figure 19D:
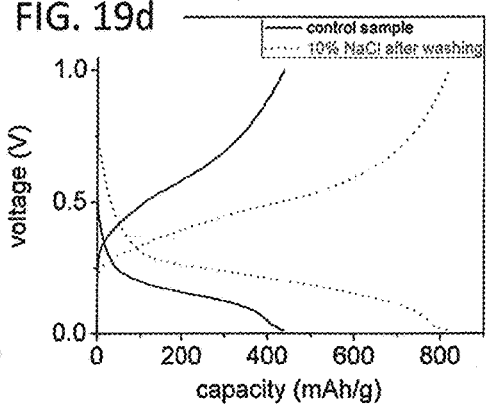
Figure 19E:
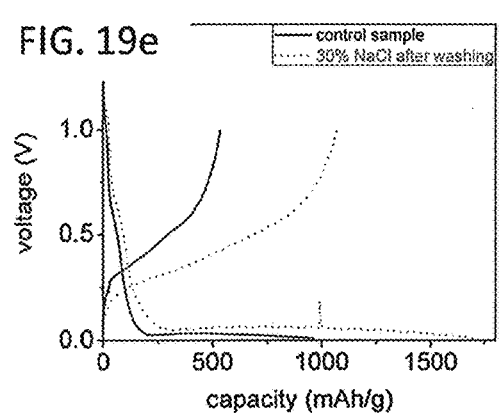
Figure 19F:
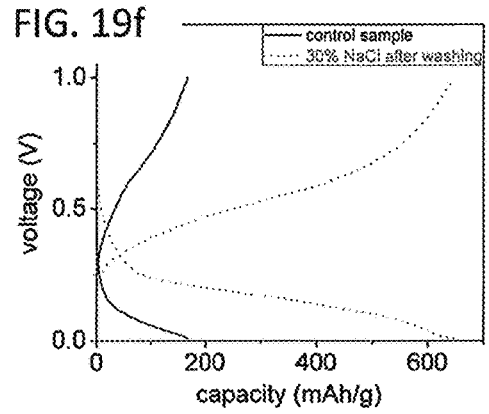

FIG. 16 illustrates SEM images of a ball-milled NaCl particle, the scale bar is 100 μm for (a), and 10 μm for (b). The ball-milled NaCl particle, indicates typical sizes in the range of 10~50 μm. NaCl is not soluble in the solvent (chlorobenzene) used to make slurries and will maintain its size and shape as shown in FIG. 16. Thus this particle size will be converted to the porosity size once the NaCl is removed by water.

A typical composition for the NaCl-containing slurry is 0.2 g PFM dissolved in 5 g chlorobenzene. First, 1.8 g SiO and determined amount of NaCl are added into the binder solution, then the slurry is stirred in a homogenizer at 2,000 rpm speed for 1 hour. A doctor blade was set to 200 or 250 μm to coat a laminate on to a Cu current collector. The electrode laminate was air-dried overnight, then punched (to 1.6 cm² electrodes) and vacuum-dried at 90° C. for 12 hours. The electrode was weighed and put into 20 mL methanol/water (1/1, weight ratio) mixture for 2 days to dissolve/remove the NaCl particles in the electrode. This methanol/water mixture etching agent is chosen because water is a good solvent for NaCl, while PFM is a very hydrophobic material. Methanol is added to ensure the permeation of the etching agent into the electrode. The washed electrode was vacuum-dried again at 90° C. for 12 hours and weighed again. The weight different before and after washing was compared to the calculated NaCl content in the electrode, to make sure most of the NaCl is removed. SEM is used to characterize the morphology of the electrode before and after washing.

FIG. 17 illustrates SEM images of SiO/PFM electrode with 10% NaCl (a)(a1)(a2) before and (b)(b1)(b2) after washing. The scale bars are 1 μm for (a)(a1)(b)(b1), 100 nm for (a2)(b2).

FIG. 18 illustrates images of SiO/PFM electrode with 30% NaCl (a)(a1)(a2) before and (b)(b1)(b2) after washing. The scale bars are 1 μm for (a)(a1)(b)(b1), 100 nm for (a2)(b2).

FIGS. 17 and 18 illustrate the morphologies of the electrode before and after porosity generation with NaCl. Multiple samples were prepared using the above-described protocols. With either 10% and 30% NaCl loading, we were able to wash away all the NaCl content in the electrode for every single sample, as indicated by the weight difference before and after washing. The increased porosity could be easily visualized in the SEM images of electrode after washing, as shown in both FIG. 17 and FIG. 18. Note that there are some residual NaCl crystals in the washed samples in FIG. 18 for 30% NaCl loading. This is supposed to be only very small amount of the NaCl leftover on the surface during the washing process, since the weight difference before and after washing is also very consistent with the calculated NaCl amount.

TABLE 5

Porosities of the SiO/PFM electrodes with ball-milled NaCl before and after washing, calculation based on the densities of PFM polymer (1.75 g/cm$^3$), SiO (2.13 g/cm$^3$), and NaCl (2.17 g/cm$^3$).

| SiO/PFM electrode | porosity of the electrode | |
|---|---|---|
| | before washing | after washing |
| with 10 wt % NaCl | 64.29% | 67.42% |
| with 30 wt % NaCl | 52.56% | 63.19% |

The porosity enhancement by this method is calculated and shown in Table 5. With 10% NaCl, the electrode porosity is increased from 64.29% to 67.42%, the improvement is from 52.56% to 63.19% for 30% NaCl samples. In addition, higher NaCl loading also generates higher porosity electrodes.

FIG. 19 illustrates (a) specific capacity and (b) areal capacity vs. cycle number of the SiO/PFM electrode, with 10% or 30% NaCl after washing, (c) $1^{st}$ cycle and (d) $20^{th}$ cycle voltage curves of SiO/PFM with 10% NaCl, (e) $1^{st}$ cycle and (f) $20^{th}$ cycle voltage curves of SiO/PFM with 30% NaCl. Using EC/DEC=3/7, 30% FEC and 1M LiPF$_6$ as electrolytes.

The effect of the generated porosities in the SiO/PFM electrode on the electrochemical performance is shown in FIG. 19. There are four different samples shown in FIGS. 19 (a) and (b). One control sample has similar loading (~3 mg SiO/cm$^2$) with the 10% NaCl sample, the other control sample has similar loading (~5 mg SiO/cm$^2$) with the 30% NaCl sample. The cells were put into 2 formation cycles at C/10 (100 mA/g) before cycling at C/3 (333 mA/g). In both small and large loadings, the generated porosities enable a better cycling performance and capacity retention. With higher loading, the control sample dropped to only ~1 mAh/cm$^2$, with a low specific capacity of ~200 mAh/g. With the increased porosity generated by 30% NaCl, this areal capacity is improved to ~3.3 mAh/cm$^2$, with a specific capacity of ~680 mAh/g. Note that, this high areal capacity at this high current density is higher compared to most of the literature values for Si-based anode in LIBs.

Additional embodiments demonstrate that this method to generate porosities in anodes works equally well on the cathode side. FIG. 20 illustrates (a) first cycles voltage curves of the high-loading lithium iron phosphate cathode after washing 30% NaCl, using lithium metal as counter electrode in EC/DEC=1, 1M LiPF$_6$ at C/10. (b) a photo of the lithium metal after cycling, proving that the cell failure is from the lithium side.

Figures 20A, 20B:
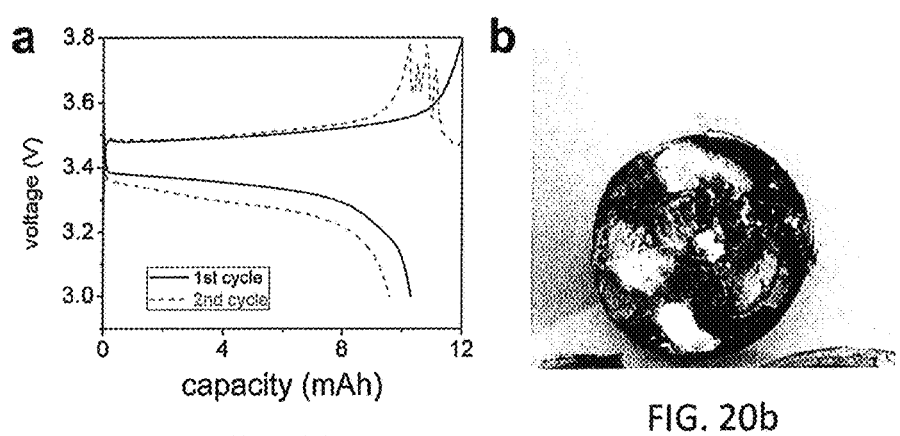
FIG. 20a illustrates (a) first cycles voltage curves of the high-loading lithium iron phosphate cathode after washing 30% NaCl, using lithium metal as counter electrode in EC/DEC=1, 1M $LiPF_6$ at C/10.
FIG. 20b illustrates (b) a photo of the lithium metal after cycling, proving that the cell failure is from the lithium side.

Following a similar protocol, a high-loading lithium iron phosphate (LFP) cathode with 30% NaCl was fabricated and the NaCl was then washed away using methanol/water co-solvent. The first two cycles voltage curves are shown in FIG. 20a. The thickness and loading of this LFP electrode is very high, but the overpotential is still ~0.1 V between charge and discharge voltage plateau. After the second cycle, the cell fails. The voltage curve after second cycle indicates a typical lithium dendrite growth, which suggests that the cell failure is from the lithium side, this is also confirmed by the appearance of the lithium metal after cycling (FIG. 20b).

In various other embodiments, both a cathode (such as lithium iron phosphate) and an anode (such as graphite and silicon) can use the following methods
1. Utilize a foaming agent to introduce porosities, such as the use of $CO_2$ as physical blowing gas to prepare high-porous electrodes by expansion of carbon dioxide saturated precursor films.
2. mix nano or micron-size elemental sulfur in the electrode, sublime S after electrode drying.
3. synthesis of block copolymers composed of active polymer binder block/etchable block, such as poly (pyrene methacrylate)/poly (lactic acid) (Ppy-co-PLA) block copolymer.

Scheme 1. The structure of Ppy-PLA block copolymer, where Ppy block is the active polymer binder and PLA is the etchable/removable block, which leaves the nanoscale porosities in the polymer/electrode.

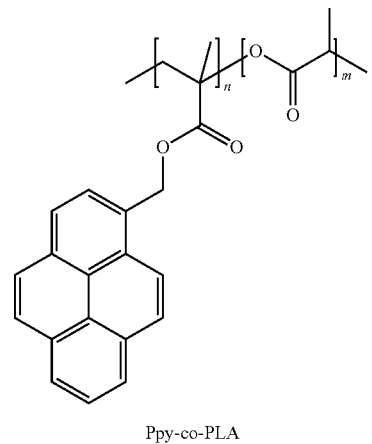

Ppy-co-PLA

In conclusion, we demonstrate the important connection between porosity and the loading of silicon (Si) electrodes. By employing an elegant and scalable method to obtain a highly porous silicon electrode, a Si electrode with high areal capacity (3.3 mAh/cm$^2$) is obtained. This method works well to achieve high loading of other high-capacity alloy anodes, the state-of-art graphite anode, as well as a high loading of positive electrodes (such as LFP shown in this application) for LIBs.

What is claimed is:

1. A method of forming a porous laminate comprising a copper foil current collector in electrical contact with a covering layer of a composition of matter comprising an active electrode material silicon monoxide (SiO), a porous conductive binder, and a stabilized lithium metal powder (SLMP), wherein silicon monoxide (SiO) in powder form is combined with stabilized lithium metal powder (SLMP) in powder form, sodium chloride (NaCl) particles, and the conductive binder, the four components mixed in an organic solvent to form a slurry, the slurry then deposited onto the copper foil current collector, followed by drying, the dried laminate is then soaked in a methanol/water mixture to dissolve the NaCl particles, followed by drying, and wherein the conductive binder is porous with an average pore size of about 10-50 μm.

2. The method of claim 1 wherein the porous conductive binder comprises a polymeric composition having repeating units of the formula:

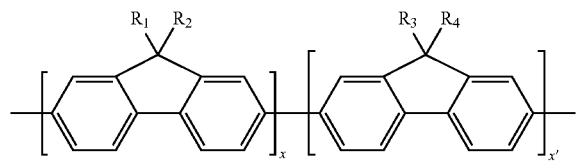

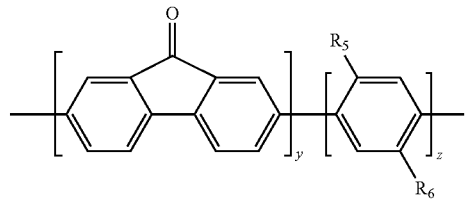

wherein $0 <= x, x', y$ and $z <= 1$, $x+x'+y+z=1$, $R_1$ and $R_2$ is $(CH_2)_n CH_3$ where n=0-8, $R_3$ and $R_4$ is $(CH_2)_n COOH$ where n=0-8, and $R_5$ and $R_6$ is any combination of H, COOH and COOCH$_3$.

3. The method of claim 1 wherein the porous conductive binder is PFM (poly(9,9-dioctylfluorene-co-fluorenone-co-methylbenzoic acid)) comprising a polymeric composition having repeating units of the formula

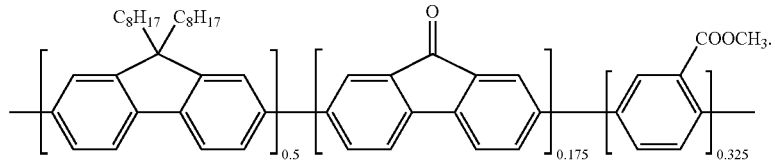

4. A method of forming a porous laminate comprising:
(a) combining (i) a copper foil current collector in electrical contact with a covering layer of a composition of matter comprising an active electrode material silicon monoxide (SiO), a porous conductive binder, and a stabilized lithium metal powder (SLMP), wherein silicon monoxide (SiO) in powder form, with (ii) a stabilized lithium metal powder (SLMP) in powder form, sodium chloride (NaCl) particles, and the conductive binder;
(b) mixing the four components of step (a) in an organic solvent to form a slurry;
(c) depositing the slurry onto the copper foil current collector, followed by drying;
(d) drying the slurry on the copper foil current collector;
(d) soaking the dried laminate in a methanol/water mixture to dissolve the NaCl particles; and
(e) drying the dried laminate;
wherein the conductive binder is porous with an average pore size of about 10-50 μm.

5. The method of claim 4 wherein the porous conductive binder comprises a polymeric composition having repeating units of the formula:

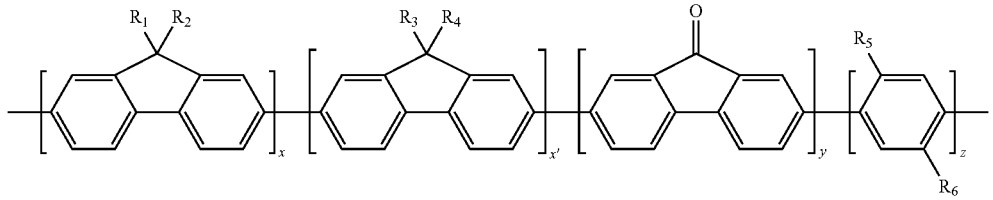

wherein $0 \leq x, x', y$ and $z \leq 1$, $x+x'+y+z=1$, $R_1$ and $R_2$ is $(CH_2)_nCH_3$ where n=0-8, $R_3$ and $R_4$ is $(CH_2)_nCOOH$ where n=0-8, and $R_5$ and $R_6$ is any combination of H, COOH and $COOCH_3$.

6. The method of claim 4 wherein the porous conductive binder is PFM (poly(9,9-dioctylfluorene-co-fluorenone-co-methylbenzoic acid)) comprising a polymeric composition having repeating units of the formula

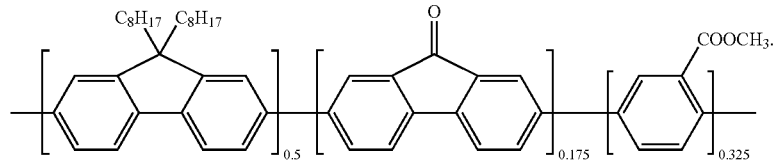

* * * * *